United States Patent [19]

Sakai et al.

[11] Patent Number: 5,569,105

[45] Date of Patent: Oct. 29, 1996

[54] DAMPER APPARATUS FOR AN AUTOTENSIONER

[75] Inventors: Kouichi Sakai, Zama; Shuhei Aoki; Shigenori Murata, both of Hiratsuka; Hayato Oumi, Chigasaki; Hiroshi Suzuki, Yokohama, all of Japan

[73] Assignee: NSK, Ltd., Tokyo, Japan

[21] Appl. No.: 281,121

[22] Filed: Jul. 28, 1994

[30] Foreign Application Priority Data

Jul. 28, 1993 [JP] Japan .................. 5-045041 U
Jul. 28, 1993 [JP] Japan .................. 5-045042 U

[51] Int. Cl.$^6$ ........................... F16H 7/08
[52] U.S. Cl. ........................... 474/110; 474/133
[58] Field of Search ........................... 474/101, 110, 474/133, 135, 138

[56] References Cited

U.S. PATENT DOCUMENTS

| | | | |
|---|---|---|---|
| 4,708,696 | 11/1987 | Kimura et al. | 474/138 X |
| 4,904,230 | 2/1990 | Kawashima et al. | 474/135 X |
| 4,911,680 | 3/1990 | Kodama et al. | 474/110 X |
| 4,940,447 | 7/1990 | Kawashima et al. | 474/110 |
| 4,950,209 | 8/1990 | Kawashima et al. | 474/110 X |
| 4,986,796 | 1/1991 | Kawashima et al. | 474/110 X |
| 5,167,402 | 12/1992 | Nakakubo et al. | 474/110 X |
| 5,186,690 | 2/1993 | Yamamoto | 474/135 |

FOREIGN PATENT DOCUMENTS

| | | |
|---|---|---|
| 212119 | 3/1987 | European Pat. Off. . |
| 63-170509 | 7/1988 | Japan . |
| 3-239845 | 10/1991 | Japan . |
| 3-118203 | 12/1991 | Japan . |
| 4-75111 | 6/1992 | Japan . |
| 4-114155 | 10/1992 | Japan . |
| 5-24840 | 6/1993 | Japan . |
| 2224095 | 4/1990 | United Kingdom . |

*Primary Examiner*—Roger J. Schoeppel
*Attorney, Agent, or Firm*—Evenson, McKeown, Edwards & Lenahan, P.L.L.C.

[57] ABSTRACT

An autotensioner for use in applying a tension to a moving belt, having a damper apparatus which can follow a sudden change in tension of the belt by improving the piston and plunger structure of the damper apparatus so that the viscous fluid has a liquid surface kept high even when the plunger rises its uppermost position to prevent air from entering underneath the piston.

14 Claims, 29 Drawing Sheets

FIG. 12(A)    FIG. 12(B)    FIG. 12(C)
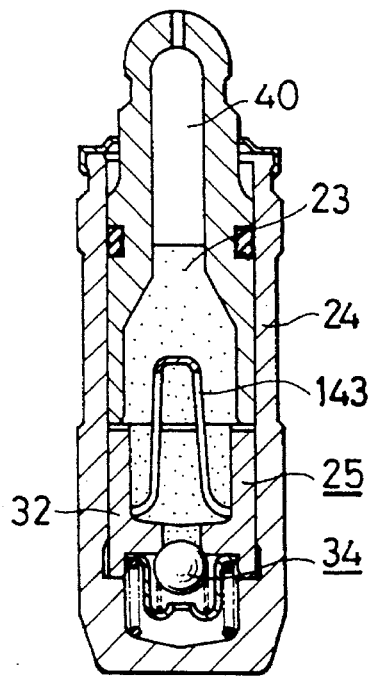 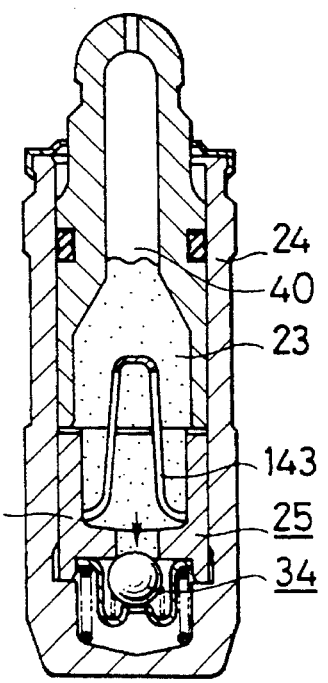 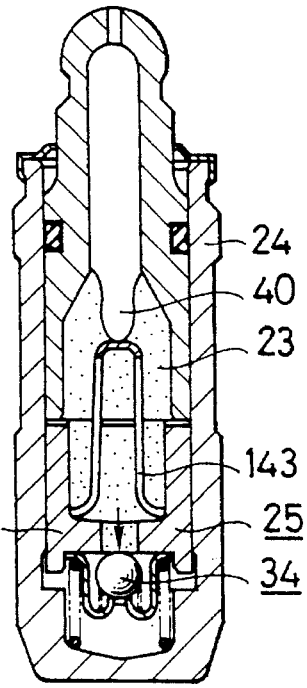
FIG. 12(D)    FIG. 12(E)    FIG. 12(F)
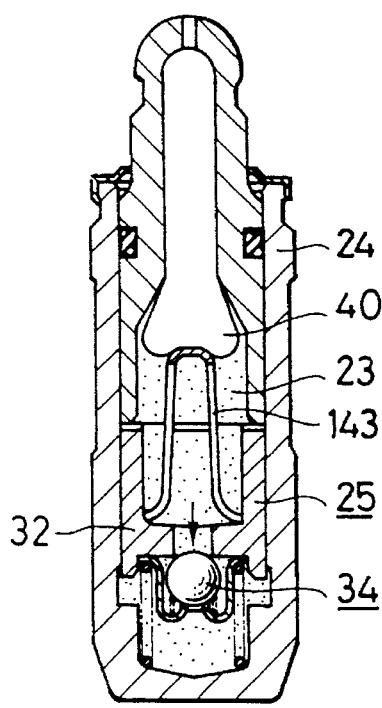 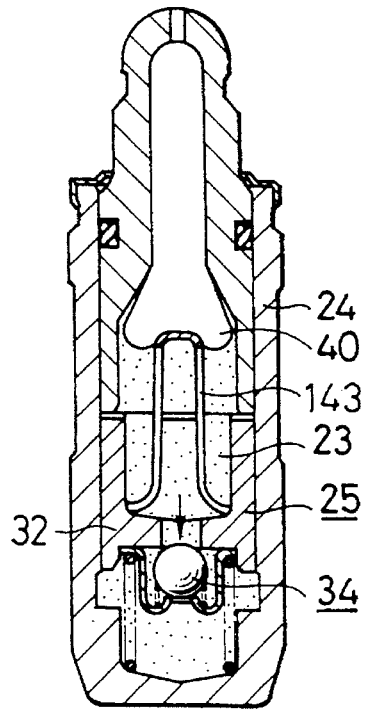 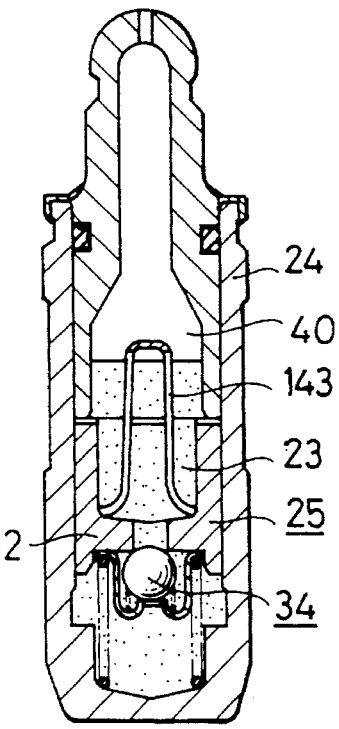

FIG. 29(A)  FIG. 29(B)  FIG. 29(C)
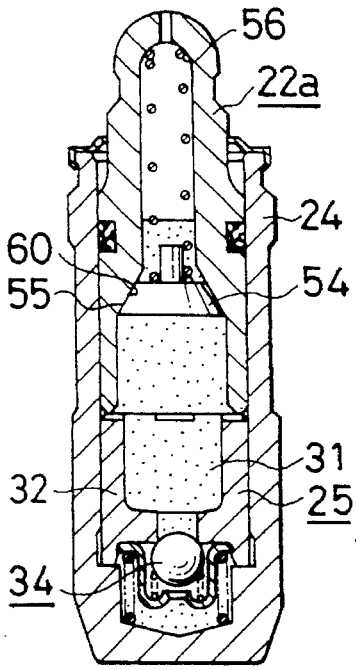
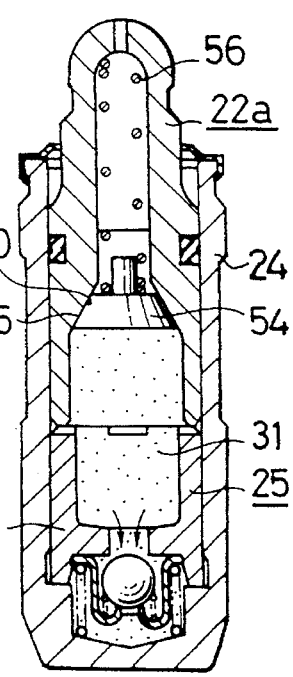
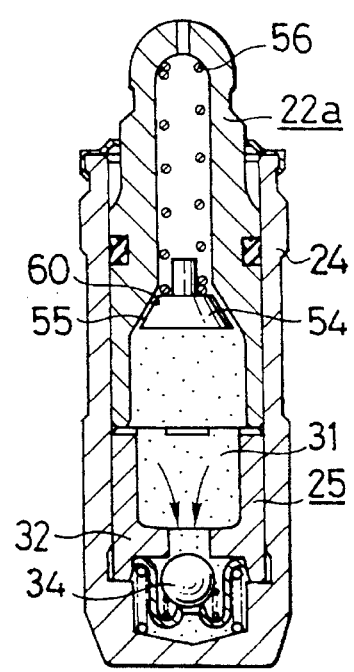
FIG. 29(D)  FIG. 29(E)  FIG. 29(F)
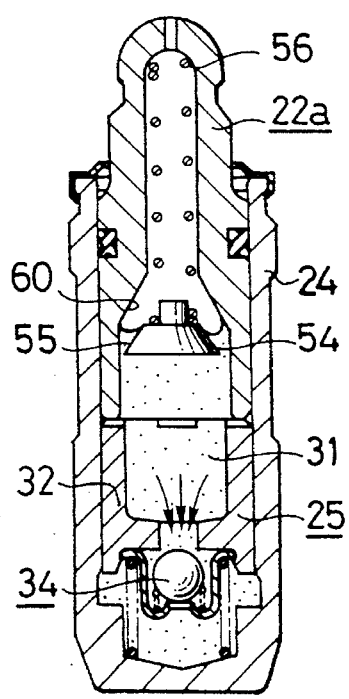
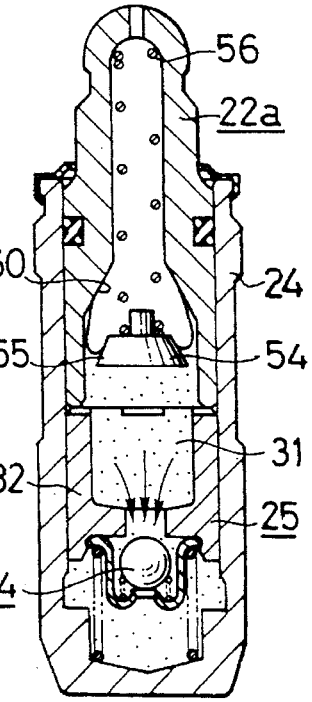
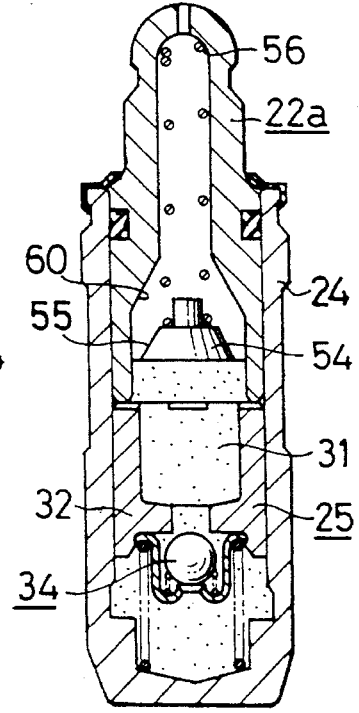

DAMPER APPARATUS FOR AN AUTOTENSIONER

FIELD OF THE INVENTION

The present invention relates to an autotensioner damper apparatus which is fitted to an autotensioner used to apply an appropriate tension to a belt such as an automotive engine timing belt or a belt for driving auxiliary equipment such as an alternator or compressor (referred to hereunder simply as a belt), so as to suppress vibration in the belt.

DESCRIPTION OF THE PRIOR ART

Drive units such as shown in FIG. 1 which use a belt 1 are widely used for driving the cam shaft of OHC or DOHC engines in synchronous timing with the crank shaft. The drive unit of FIG. 1 comprises a drive pulley 2 driven by the engine crank shaft, a follower pulley 3 fixed to an end of the cam shaft, guide pulleys or follower pulleys 4 for guiding the belt 1 or driving auxiliary equipment such as a water pump, and a pulley 5 for producing an appropriate tension in the belt 1.

The pulley 5 is pivotally mounted on a rocking or pivotable member 7 which pivots about a pivot shaft 6. The end of a bracket 8 which is fixed to the rocking member 7 is fitted with a spring 9 which acts so that the pulley 5 is resiliently pressed against the belt 1, thus keeping the tension of the belt 1 constant irrespective of vibration in the belt 1 due to the engine operation, or dimensional changes in the belt 1 due for example to temperature changes.

In addition to the function of tensioning the belt 1 however, a belt control function is also required in the autotensioner. With the cam shaft drive unit shown in FIG. 1, there is tendency for the belt 1 to vibrate at some location between the pulleys 2 and 5 swinging in a direction perpendicular to the direction of travel. If such vibration is permitted the amplitude of vibration increases (vibration growth) so that the belt produces abnormal vibrations in the drive components, or in the case of a toothed belt, there is the possibility of so called "tooth skipping".

In view of these problems, a damper apparatus has heretofore been fitted to the autotensioner as disclosed for example in Japanese Patent First Publication KOKAI Nos. S58-65357 and S63-180759, so that the belt 1 is controlled by the damper apparatus. The pulley in these autotensioners, however, displaces slowly in any direction so as not to follow the belt as it is slackening. Consequently, the tension of belt may be temporarily lower.

To more reliably prevent slackening of the belt 1 the pulley 5 is made to quickly follow the belt 1 at the time of slackening, and to retain the belt without retracting when under tension. Such belt control autotensioners are also disclosed for example in Japanese Patent First Publication KOKAI Nos. S63-167163, H2-72252, H2-80839, H3-24346, and Japanese Utility Model First Publication KOKAI Nos. H2-16846, H2-98243, H4-39349.

Japanese Patent First Publication No. S63-167163 discloses an autotensioner having a one-way clutch between the viscous damper and the swinging member.

Japanese Patent First Publication No. H2-80839 and Japanese Utility Model First Publication No. H2-16846 disclose a ratchet mechanism in the damper apparatus.

Japanese Patent First Publication No. H2-72252, Japanese Patent First Publication No. H3-24346 and Japanese Utility Model Publication No. H2-98243 discloses a one-way damper apparatus with a check valve.

Japanese Utility Model First Publication No. H4-39349 discloses a damper apparatus having a slope surface for the viscous liquid to easily flow in one direction only.

These autotensioners have however, some problems as follows; One-way clutch is insufficient in durability due to fretting abrasion (No. S63-167163). Internal structures are so complicated to need difficult and costive production processes (No. H2-72252, H2-80839, H3-24346, H2-16846, H2-98243).

The properties in some autotensioners may, however, be subject to secular change due to abrasion in components, and the pulley may not follow well due to effects of viscous liquid resistance even when the belt is slackening (No. H2-72252, No. H3-24346, No. H2-98243, No, H4-39349).

In addition, Japanese Patent First Publication KOKAI No. S62-274143 and Utility Model First Publication KOKAI No. S60-52458 disclose an autotensioner structure comprising a rocking member and a damper apparatus separated from the rocking member, each mounted to the front face of the engine cylinder block.

However, some autotensioners need larger installation spaces, and are insufficient in following rapid decrease in belt tension (No. S62-274143 and No. S60-52458).

SUMMARY OF THE INVENTION

An autotensioner for use in applying a tension to a moving belt, has a damper apparatus which has upper and lower chambers with a release path between them and a check valve for the release path, and can follow a sudden change in tension of the belt by placing a blockage member above the releace path for the viscous fluid so that the viscous fluid has a liquid surface kept high even when the plunger rises its uppermost position to prevent air from entering underneath the piston.

BRIEF DESCRIPTION OF THE DRAWINGS

FIG. 12(A) to FIG. 12(F) are longitudinal cross sectional views of the damper apparatus of FIG. 10;

FIG. 29(A) to FIG. 29(E) are longitudinal cross sectional views of the damper apparatus of FIG. 27;

DESCRIPTION OF THE PREFERRED EMBODIMENTS

Figure 1:
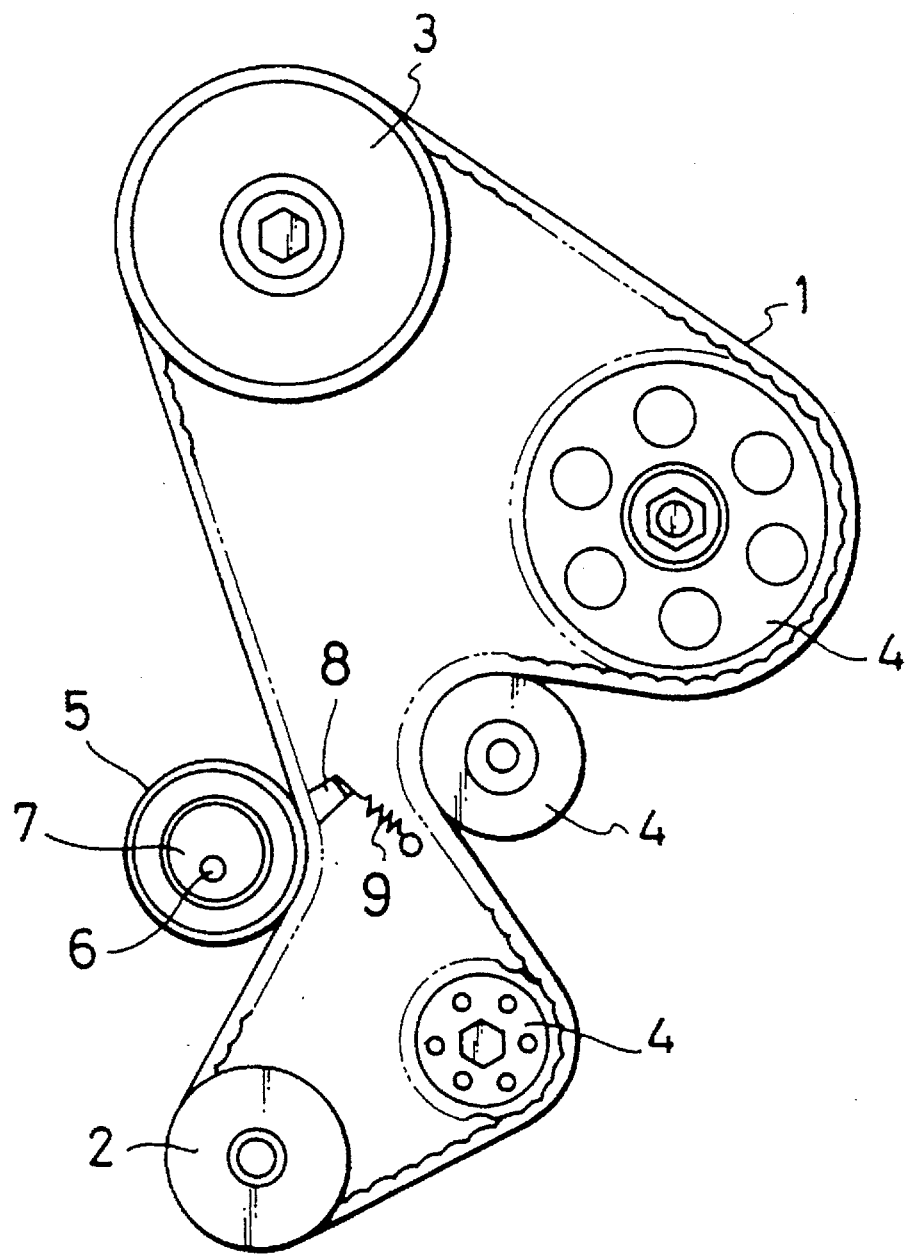
FIG. 1 is a front elevation view showing one example of a use of a conventional autotensioner.
Figure 2:
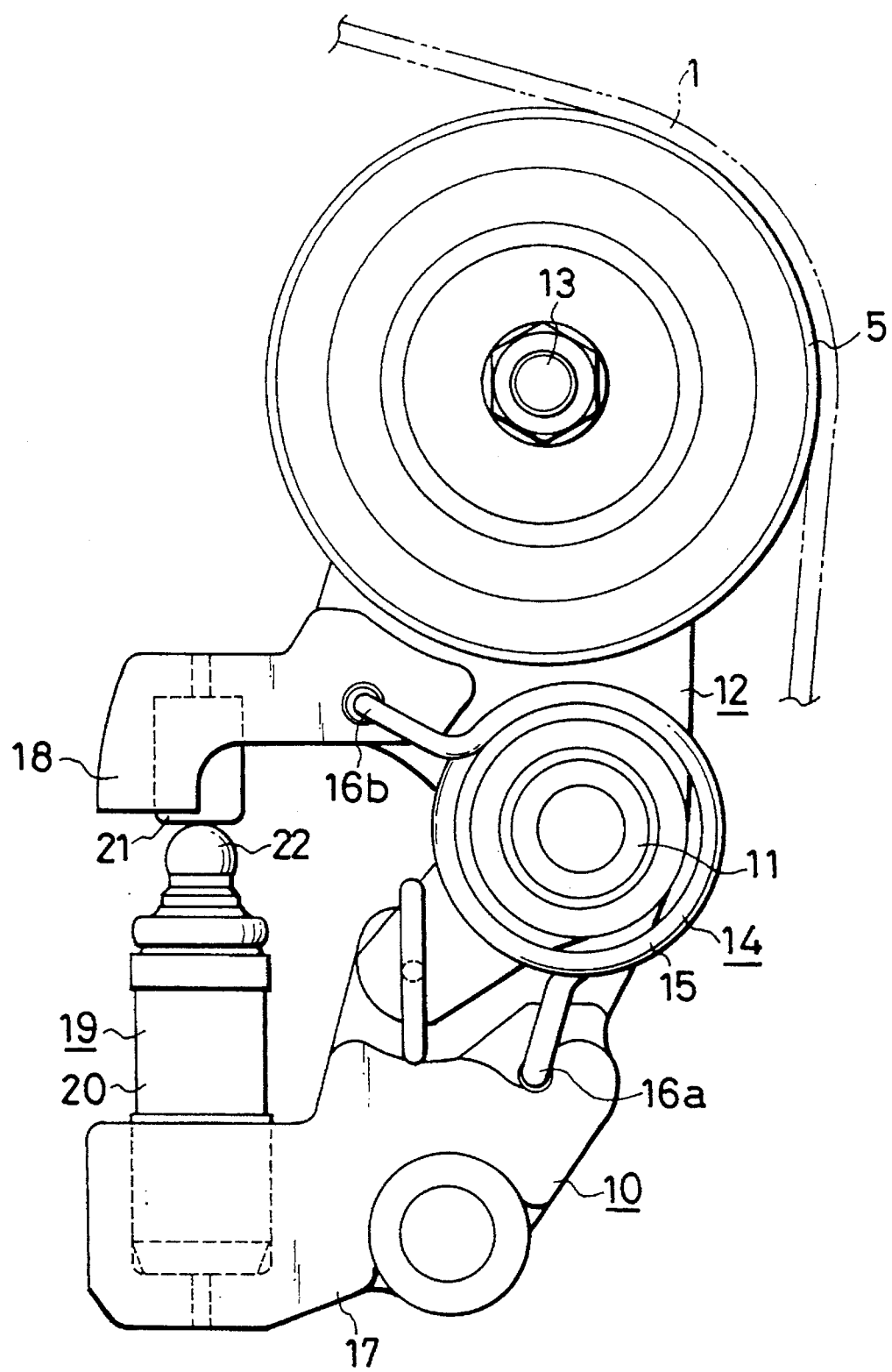
FIG. 2 is a front elevational view showing an example of an autotensioner related to the present invention.

The autotensioner of the present invention as shown in FIG. 2 comprises a rocking or pivotable member 12 having a base end pivotally mounted on a fixed shaft 11 which is provided on a fixed or base member 10, and pivot shaft or axle 13 which is aligned in parallel with the fixed shaft 11 provided on a tip end thereof. A pulley 5 is supported on the pivot shaft 13 so as to rotate freely therearound, and a belt 1 to which a tension is applied is wrapped around a portion of the pulley 5. A torsion coil spring 14 has a coil portion 15 for applying a resilient force to the rocking member 12 in a direction so as to press the pulley 5 against the belt 1. The coil portion 15 is arranged around the fixed shaft 11. The coil spring 14 also has a pair of engagement portions 16a, 16b on the ends of the coil spring 14 which are respectively engaged with the fixed or base member 10 and the rocking member 12, so that the force is applied to the rocking member 12 in the abovementioned direction.

Moreover, a damper apparatus 19 having a cylinder 20 with a base end and a plunger or push member 22 with a tip end is provided between a fixed side arm or projection 17 on the fixed or base member 10 and a rocking side arm 18 on the rocking member 12. With the construction shown in the FIG. 2, the base end of the cylinder 20 is fixed in an end portion of the fixed side arm 17, and the tip end of the plunger 22 is abutted against a lower face of a bearing block 21 fixed to an end portion of the rocking side arm 18.

Figure 3:
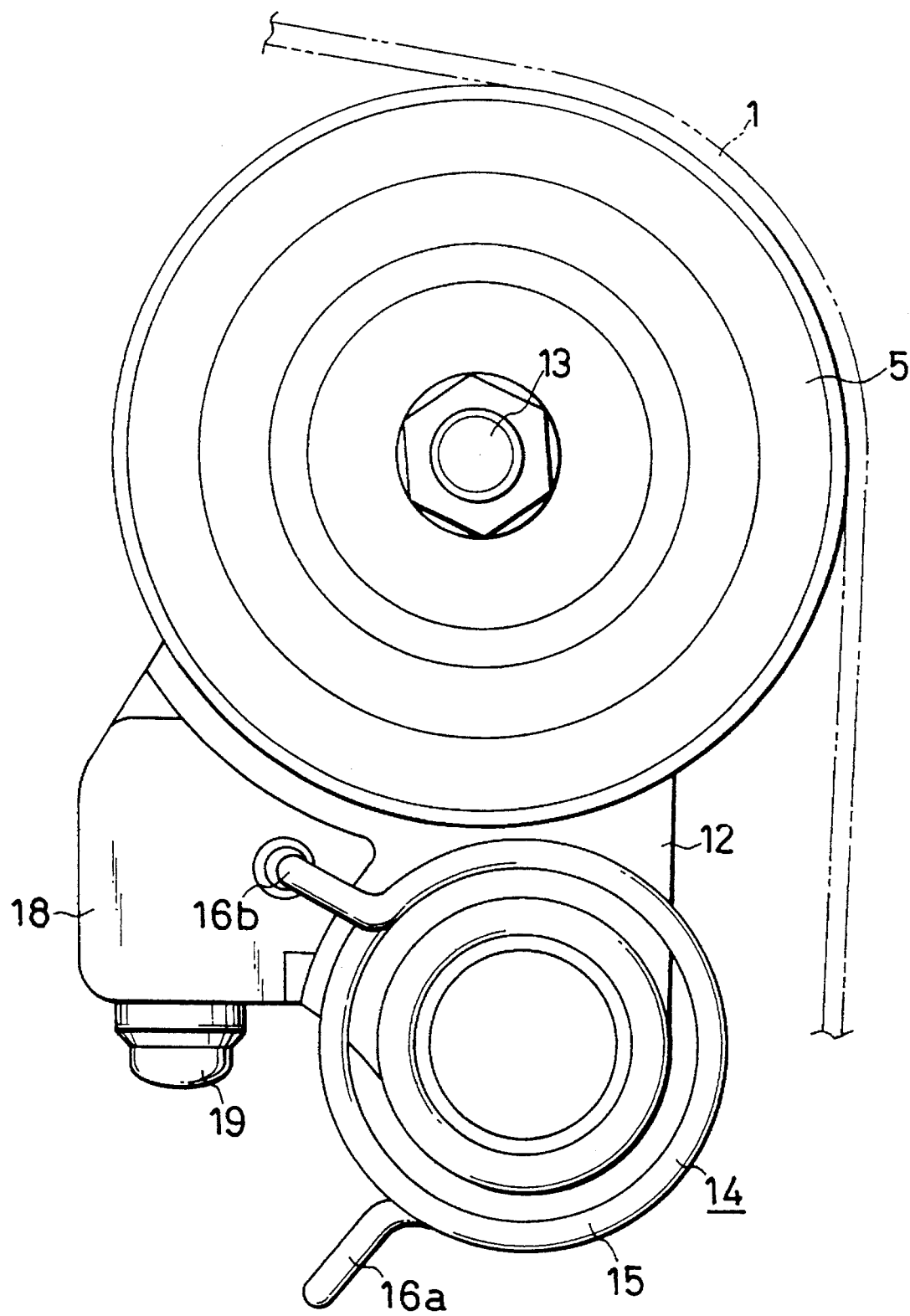
FIG. 3 is a front elevational view of another example of an autotensioner related to the present invention.

With the autotensioner shown in FIG. 3, the fixed member 10 as in the construction of FIG. 2 has been omitted. In this case the damper apparatus 19 is supported in the tip end of the rocking side arm 18, with a portion at the bottom end of the damper apparatus 19 protruding from the lower face of the rocking side arm 18 so as to abut against a protrusion (not shown in the figure) formed on a fixed portion such as the front face of the engine cylinder block. In addition, the engaging end 16a of the coil spring 14 is connected to this fixed portion.

Figure 4:
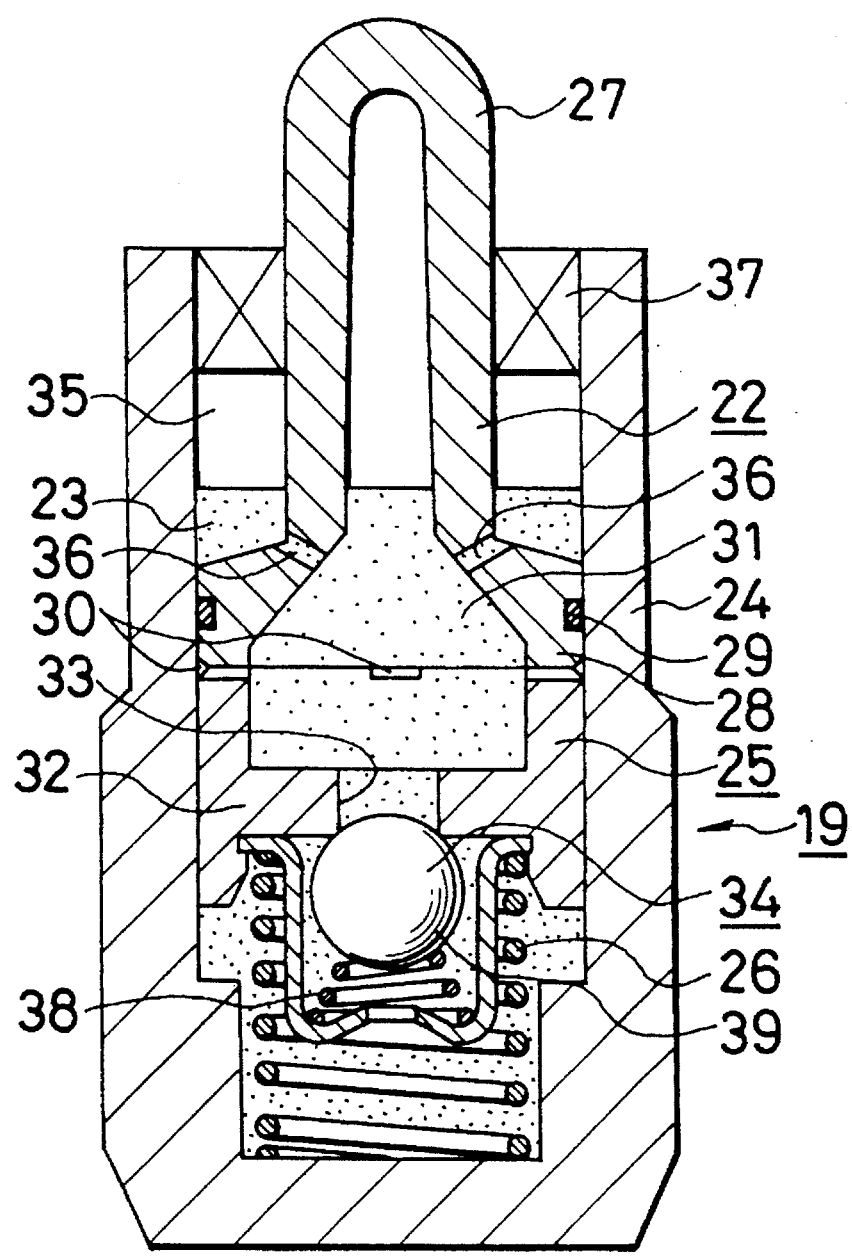
FIG. 4 is a longitudinal cross sectional view of an autotensioner damper apparatus related to the present invention.
Figure 5A:
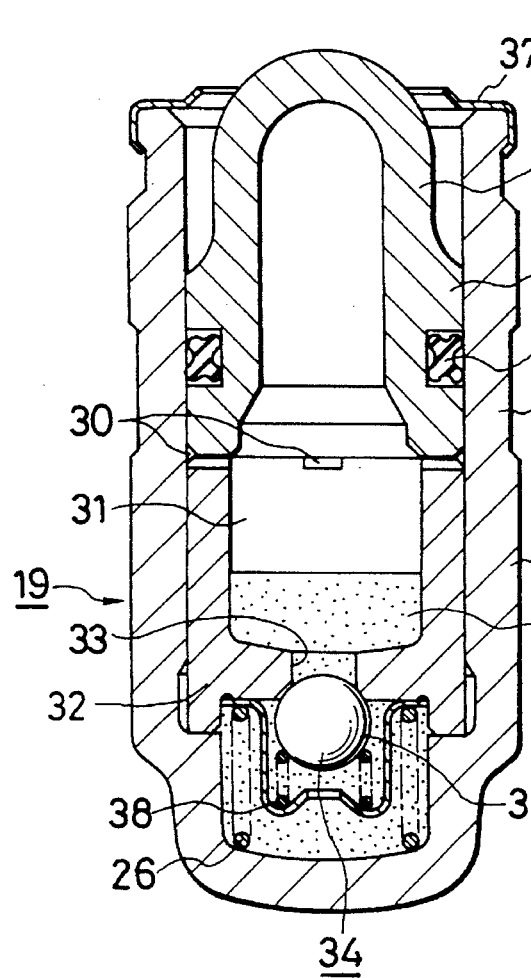
FIG. 5(A) and FIG. 5(B) are longitudinal cross sectional views illustrating another embodiment of a damper apparatus in a contracted condition and an extended condition.
Figure 5B:
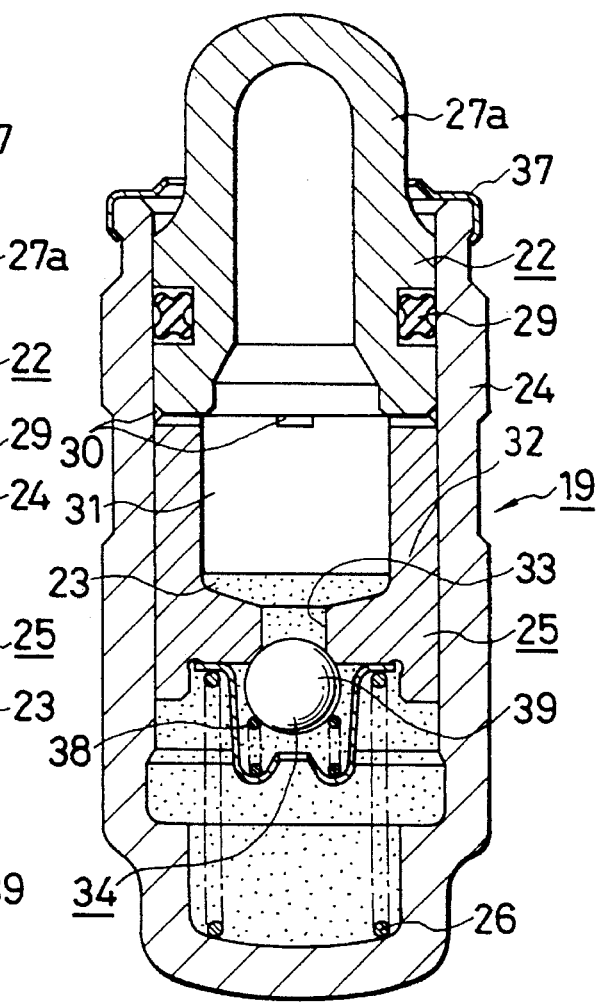

The damper apparatus 19 for either of the above arrangements of autotensioner is constructed as shown in FIG. 4 or FIG. 5(A), 5(B). With these constructions, a cylindrical tube member 24 (referred to as "cylinder" hereinafter) containing a viscous liquid 23 such as silicone oil, has as open upper end and a closed lower end with bottom. A piston 25 is fitted inside a lower half of the cylinder 24 so as to move freely up and down therein. There is a plunger or push member 22 above the piston 25.

A very small gap is provided between an outer peripheral face of the piston 25 and an inner peripheral face of the cylinder 24, so that the viscous liquid 23 can flow slowly between the regions above and below the piston 25 by way of this small gap.

A compression or biasing spring 26 is provided between a lower face of the piston 25 and an upper face of the base of the cylinder 24 to urge the piston 25 in an upward direction.

In addition, the plunger 22 has a base or lower body 28 which is fitted inside an upper half of the cylinder 24 so as to move freely in an upward and downward direction, with a seal 29 provided between the inner peripheral face of the cylinder 24 and an outer peripheral face of the base or lower body 28 to give a fluid tight seal therebetween.

A plurality of cut-outs 30 are formed in an upper end face of the piston 25 whereby an inner space 31 existing inside a region of the abutment of the base or lower body 28 and the piston 25 is communicated with the beforementioned small gap.

The piston 25 also comprises a partition wall 32 with a central portion thereof formed with a through hole 33 which provides a passage communicating between the upper and lower sides of the piston 25. A check valve 34 is provided on a lower side of the partition wall 32 for open/closing the through hole 33. The check valve 34 comprises a ball 39 which is urged by a spring 38 to resiliently press against the lower end opening of the through hole 33, and functions so as to open only when the piston 25 is displaced in an upward direction by the resilient force of the compression spring 26.

With the first embodiment of damper apparatus 19 shown in FIG. 4, the outer diameter of an end portion protrusion 27 of the plunger 22 is made a certain amount smaller than the inner diameter of the cylinder 24, and a lower half portion of an upper space 35 formed between an outer peripheral face of the end portion 27 and an upper inner peripheral face of the cylinder 24 is also filled with viscous liquid 23. In addition, through holes 36 are provided in the portion between the base 28 and the end portion 27, so that the viscous liquid 23 can freely flow therethrough between the upper space 35 and the inner space 31.

A seal ring 37 is provided between the upper inner peripheral face of the cylinder 24 and the outer peripheral face of the end portion 27 to cover the upper end opening of the upper space 35.

On the other hand, with the embodiment of damper apparatus 19 shown in FIG. 5(A) and FIG. 5(B), wherein FIG. 5(A) shows the contracted condition of the damper apparatus 19, while FIG. 5(B) shows the extended condition, the end portion 27a has a relatively large diameter, so that the internal volume of the end portion 27a is made large. Instead, the through holes 36 of FIG. 4 for communicating between the interior and exterior of the plunger 22 are omitted.

When the damper apparatus 19 of FIGS. 5(A) and FIG. (B) is assembled in the autotensioner as shown in FIG. 3, the cylinder 24 protrudes from the lower face of the rocking side arm 18, so that the lower end face of the cylinder 24 can abut against an upper face of a protrusion formed on a fixed portion such as the front face of the engine cylinder block.

Figure 6:
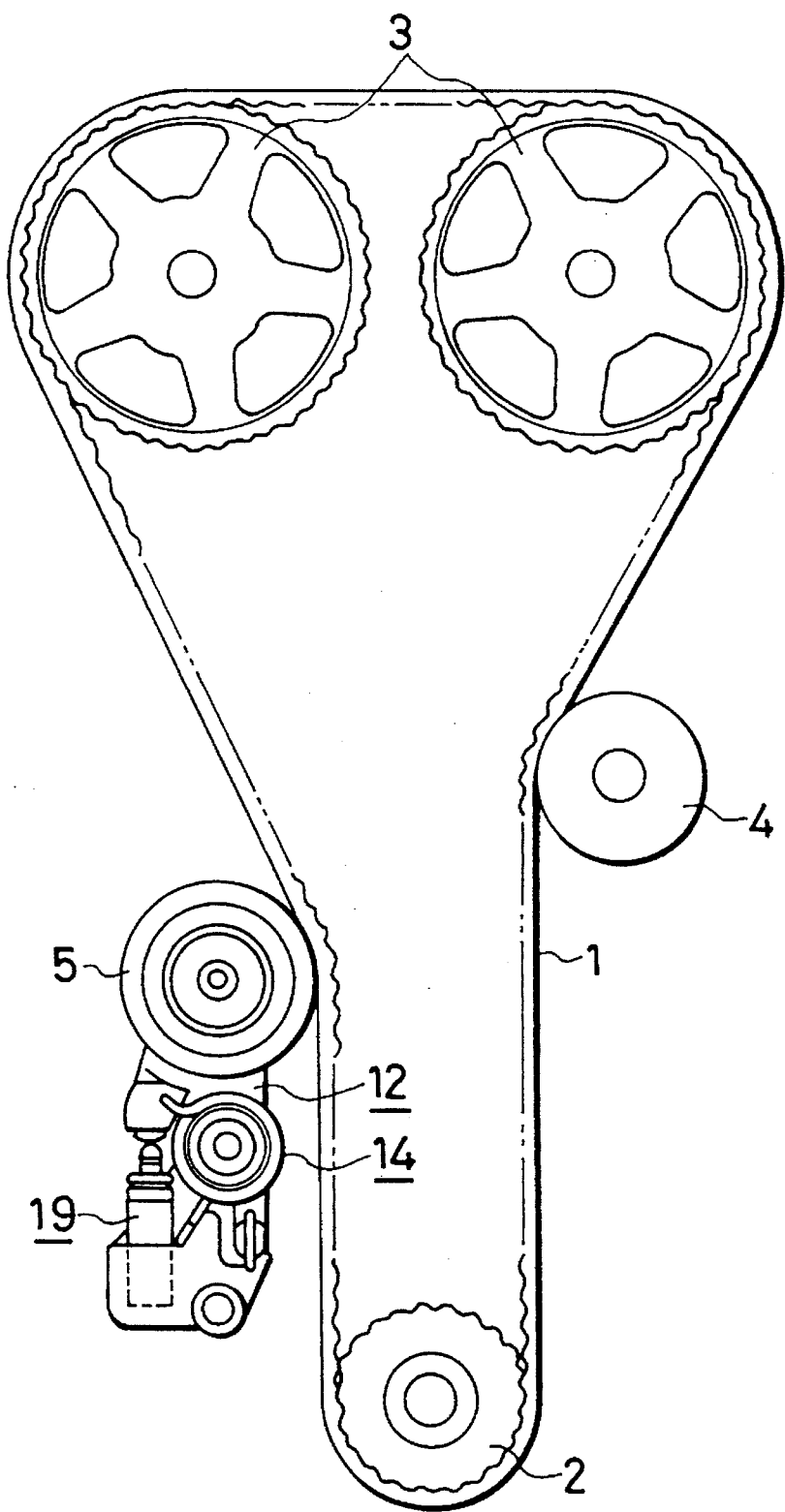
FIG. 6 is a front elevational view showing an example of use of an autotensioner according to the present invention.

The autotensioner incorporating the damper apparatus 19 constructed as above and assembled in the previously described manner is fitted to an engine as shown in FIG. 6, so as to produce an appropriate tension force in a cam shaft drive belt 1. In using the autotensioner as shown in FIG. 6, the rocking member 12 is swung by the resilient force of the coil spring 14 so that the pulley 5 which is rotatably mounted on the pivot shaft 13 at the tip end of the rocking member 12 is resiliently pressed against the belt 1. The rocking member 12 is restricted in rocking by the pressing of the pulley 5 against the belt 1.

In this condition, the damper apparatus 19 provided between the rocking side arm 18 and the fixed side arm 17 (for the construction of FIG. 2) or between the rocking side arm 18 and the protrusion (not shown) formed on the fixed portion of for example the cylinder block (for the construction of FIG. 3), provides a support or tension condition between the rocking side arm 18 and the fixed side arm 17 (or the protrusion), which depends on the resilient force of the compression spring 26.

When the belt 1 slackens from this condition, the rocking member 12 swings under the resilient force of the coil spring 14 so that the pulley 5 follows the movement of the belt 1. At this time, the displacement of the plunger 22 of the damper apparatus 19 is slightly delayed so that the tip end of the plunger 22 and the lower face of the bearing block 21 (for the construction of FIG. 2), or the lower face of the cylinder 24 and the upper face of the protrusion (for the construction of FIG. 3, not shown) are separated from each other.

Therefore, when the belt 1 slackens, the rocking member 12 swings so that the pulley 5 follows the movement of the belt 1 with absolutely no resistance from the damper apparatus 19. The pulley 5 can thus quickly follows the movement of the belt 1 thereby avoiding a drop in tension of the belt 1. Meanwhile the overall length of the damper apparatus 19 is extended under the resilient force of the compression spring 26 with a slight lag behind the movement of the rocking member 12.

During extension of the damper apparatus 19 under the resilient force of the compression spring 26, the check valve 34 opens. That is to say, the bell 39 moves relatively downwards against the resilient force of the spring 38 thus opening the lower end opening of the through hole 33 formed in the partition wall 32. As a result, the viscous liquid 23 flows freely from the upper side of the partition wall 32 to the lower side, so that the piston 25 and the plunger 22 rise comparatively quickly. There is thus only a very short time delay before the damper apparatus 19 again provides a support or tension between the rocking side arm 18 and the fixed side arm 17 (or the protrusion).

On the other hand, when the tension in the belt 1 increases, the rocking member 12 tends to rock against the resilient force of the coil spring 14. In this situation, the rocking side arm 18 presses the damper apparatus 19 in a compressive direction. Therefore, in this case the rocking of the rocking member 12 requires the plunger 22 and the piston 25 to be pressed against the resistance of the compression spring 26, into the cylinder 24.

At this time, since the check valve 34 remains closed, then for the piston 25 to move in a downward direction, the viscous liquid 23 in the region below the piston 25 must flow to the region above the piston 25 by way of the small gap between the inner peripheral face of the cylinder 24 and the outer peripheral face of the piston 25. However, due to the limitation on the amount of viscous liquid 23 that can flow by way of the small gap, the displacement of the piston 25 and the plunger 22 can only proceed slowly. As a result, the pulley 5 supported on the rocking member 12 can only move slowly so that the belt 1 is controlled or retained by the pulley 5 thus suppressing the growth of vibration in the belt 1.

With the autotensioner damper apparatus constructed as described above and fitted to an autotensioner in the above embodiments, when the tension of the belt 1 is quickly and considerably reduced from a high tension condition, there is the possibility of air entering into the region below the piston 25. If this occurs the performance of the damper apparatus 19 is reduced.

This phenomena of a sudden reduction in tension from a high tension condition of the belt 1 often occurs at the time of starting and stopping the engine. When this occurs the overall length of the damper apparatus 19 is rapidly extended by the resilient force of the compression spring 26 from the compressed condition.

Figure 7A:
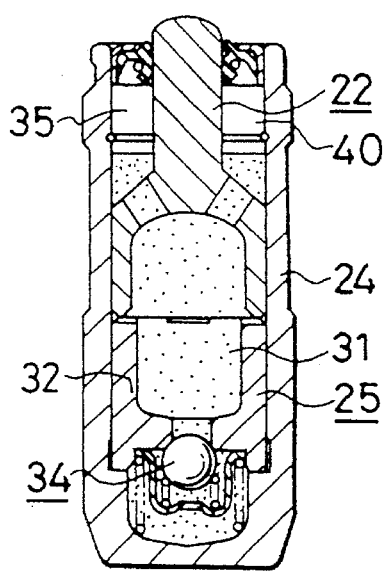
FIG. 7(A) to FIG. (E) are longitudinal cross sectional views of the damper apparatus as shown FIG. 4.
Figure 7B:
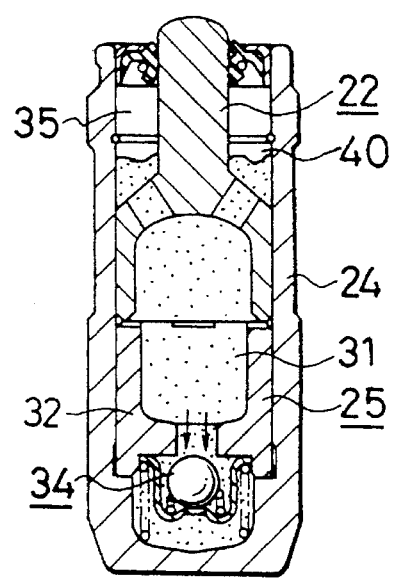
Figure 7C:
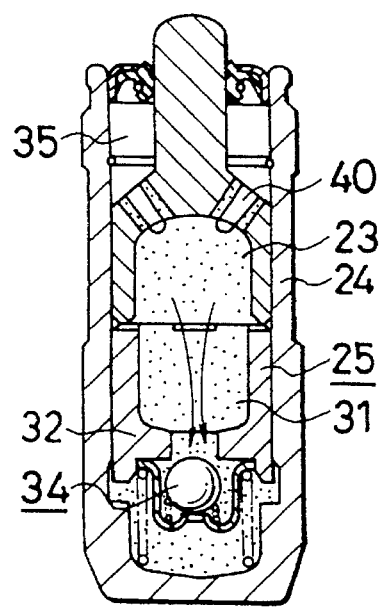
Figure 7D:
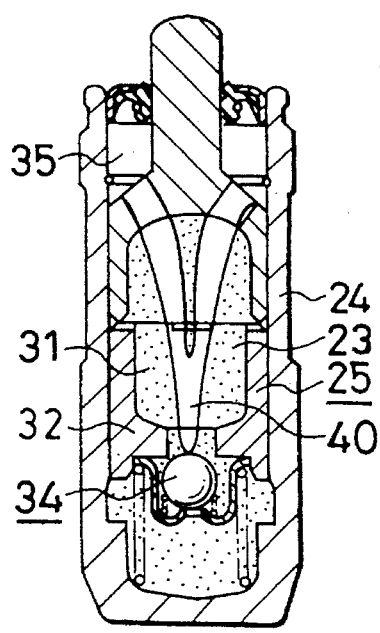
Figure 7E:
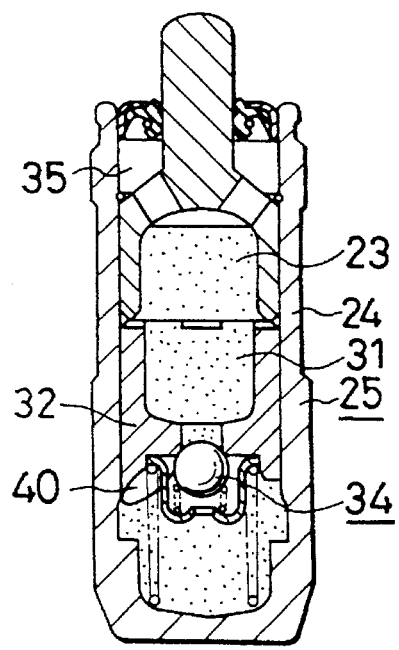

For example, with the damper apparatus 19 having the construction shown in FIG. 4, when the abovementioned phenomena occurs, then the damper apparatus 19 once compressed as shown in FIG. 7(A) extends by way of the conditions of FIG. 7(B) to FIG. 7(D) to the condition shown in FIG. 7(E). When the damper apparatus 19 contracted shown in FIG. 7(A) extends, then at first as shown in FIG. 7(B), the check valve 34 opens, and the plunger 22 and piston 25 start to rise.

With the rise of the piston 25, the viscous liquid 23 in the upper space 35 flows into the inner space 31 by way of the through holes or upper vent passages 36. At this time however, as shown in FIG. 7(C), air 40 in the upper space 35 also enters into the inner space 31 by way of the through holes 36. If the piston 25 rises rapidly, then as shown in FIG. 7(D), the air 40 entering the inner space 31 from the through holes 36 passes through the inner space 31 and through the through hole 33 in the center of the partition wall 32, and reaches the region below the partition wall 32.

Figure 9:
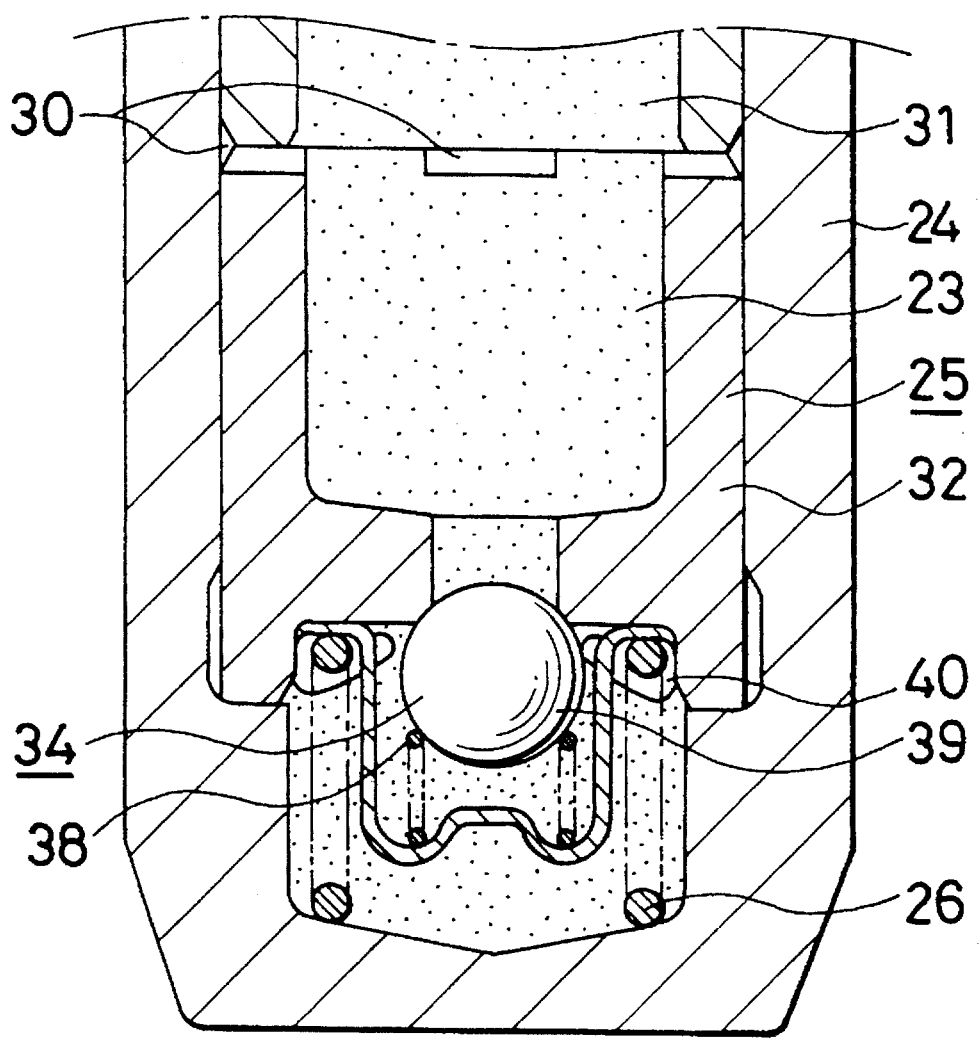
FIG. 9 is a cross sectional view of a lower portion of a damper apparatus illustrating a condition wherein air has entered into a region below the piston.

Then after the piston 25 stops rising and the check valve 34 closes, a portion of the air 40 which has passed into the region below the partition wall 32 remains there below the partition wall 32 as shown in FIG. 7(E), and FIG. 9.

Figure 8A:
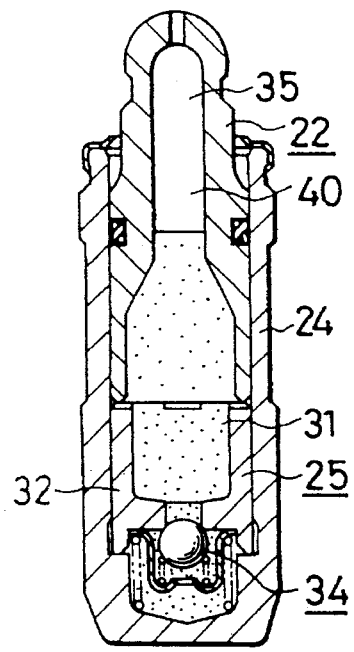
FIG. 8(A) to FIG. 8(F) are longitudinal cross sectional views of the damper apparatus as shown FIG. 5.
Figure 8B:
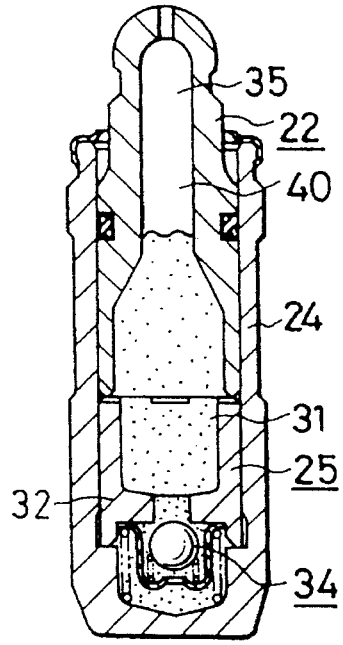
Figure 8C:
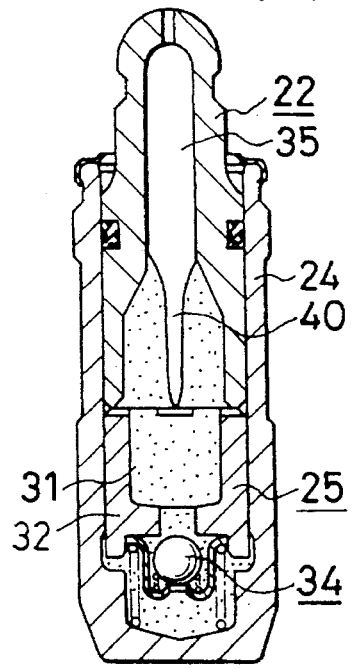
Figure 8D:
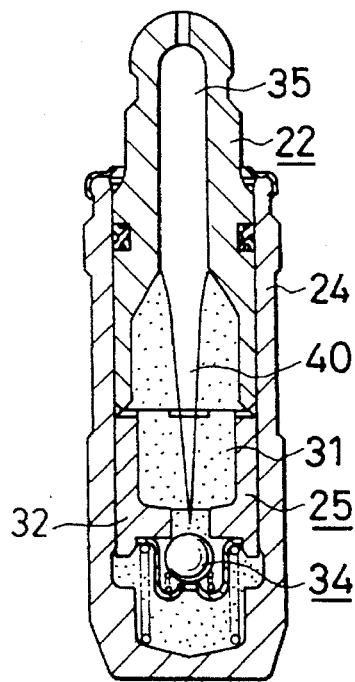
Figure 8E:
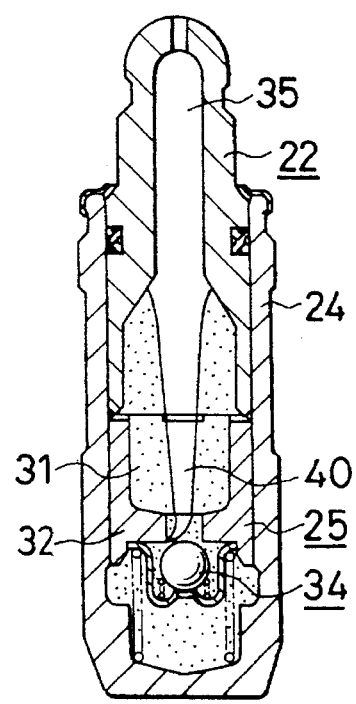
Figure 8F:
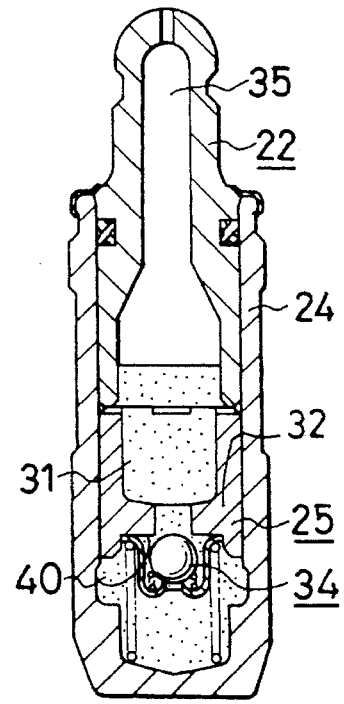

Also with the damper apparatus 19 having the construction shown in FIGS. 5(A) and 5(B), during displacement from the contracted condition shown in FIG. 8(A) to the extended condition shown in FIG. 8(F) by way of the conditions of FIG. 8(B) to FIG. 8(E), the air 40 enters into the region below the partition wall 32 and remains there as shown in FIG. 9.

Since the air 40 which has entered in this way to the region below the partition wall 32 is a compressible fluid in contrast to the incompressible viscous liquid 23, it resiliently expands and contracts over the full length of travel of the damper apparatus 19 so that the performance of the damper apparatus 19 is deteriorated.

The autotensioner dampers of subsequent embodiments of the present invention are directed towards preventing air entering into the region below the piston 25, so as to prevent the resultant deterioration in performance as mentioned above.

The autotensioner damper apparatus according to the subsequent embodiments is installed in the autotensioner which comprises a fixed member, a fixed shaft provided on the fixed member, a rocking member with a base end supported on the fixed shaft so as to rotate freely thereabout, a pivot shaft aligned in parallel with the fixed shaft and provided on a tip end of the rocking member, a pulley supported on the pivot shaft so as to rotate freely therearound, and a tension spring for applying a resilient force to the rocking member in a direction so as to press the pulley against the belt. Specifically, the damper apparatus is provided between a fixed portion and a rocking side arm provided on the rocking member.

Such an autotensioner damper apparatus according to the these embodiments, as with the damper apparatus assembled in the autotensioner of the beforementioned embodiments, comprises a cylindrical member or cylinder containing a viscous liquid, a piston fitted inside the cylinder so as to move freely in an axial direction, a spring provided between the piston and the cylinder for urging the piston in one direction, a plunger or push member which follows the displacement of the piston under the urging force of the spring so as to increasingly protrude from the cylinder, a passage connecting between opposite sides of the piston in an axial direction, and a check valve for opening/closing the passage. The check valve functions so as to only open the passage when the piston is displaced by the resilient force of the spring.

In particular, with the autotensioner damper apparatus of these embodiments, the cylinder is cylindrical in shape with an open upper end and a closed lower end, and the spring is a compression spring provided between the upper face of the bottom of the cylinder and the lower face of the piston. A lower half of the plunger is formed with a cylindrical portion which slides within the inner peripheral face of the cylinder.

An oil chamber or cavity is defined by the cylindrical portion of the lower half of the plunger and the inner peripheral surface of the piston, and a baffle board or obstruction plate is provided within the oil chamber to change the flow in direction of the fluid.

In addition, a porous member can be provided instead of the baffle board in the oil chamber.

In addition, a float can be provided on the surface of the viscous fluid instead of the baffle board in the oil chamber. The upper section is closed by the float when the plunger goes down.

In addition, the lower surface of the piston can be tilted in a radial direction, so that the air which has entered below the lower surface of the piston can be easily discharged upwards.

When the autotensioner damper in these embodiments is installed into an autotensioner so as to control vibration in a belt, the operation at the time of controlling the displacement of the rocking member supporting the pulley is similar to that of the autotensioner dampers of the previous embodiments.

In particular, with the autotensioner damper of these embodiments, since there is a baffle board or obstruction plate, porous member or float as mentioned above, then even if the damper apparatus is extended suddenly, there is little likelihood of the air above the viscous liquid passing into the interior of the plunger by way of the through hole. As a result, the air cannot enter into the region below the piston so that the reduction in performance of the damper due to air can be avoided. Even if air happens to enter into the region below the piston, the air can be easily discharged from there, and the function of the damper apparatus instantly restores.

Figure 10:
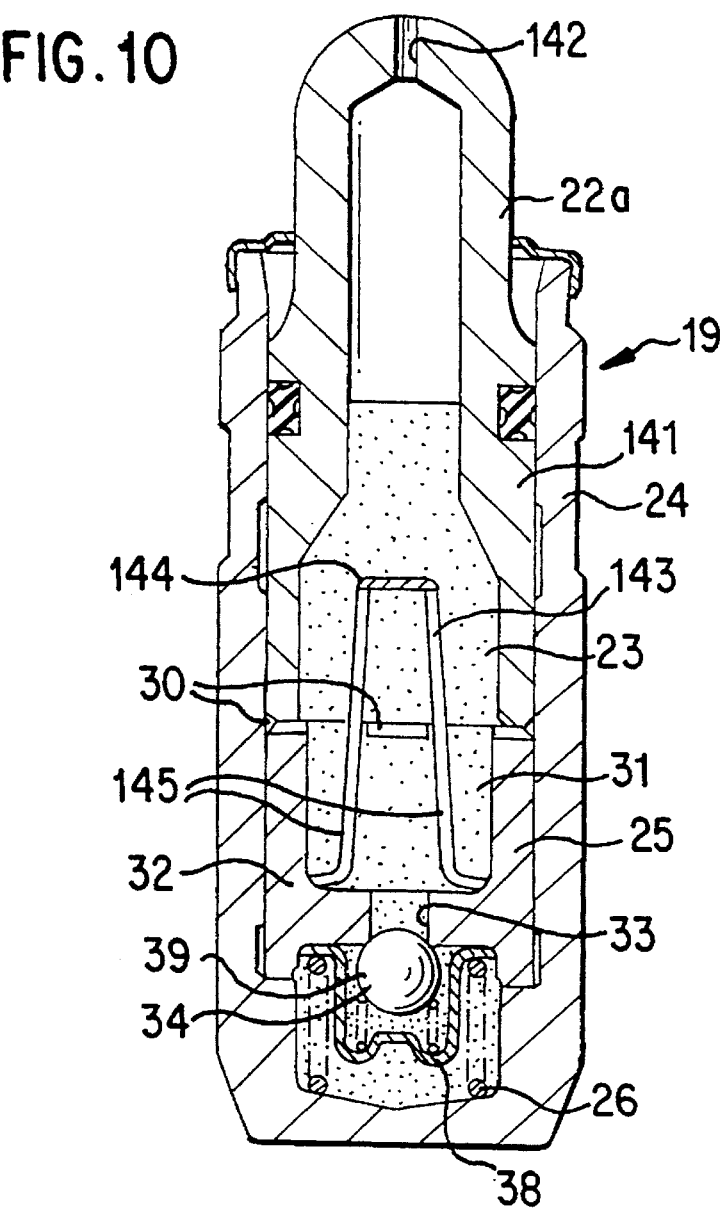
FIG. 10 is a longitudinal cross sectional view of an autotensioner damper apparatus related to the present invention.

Such an embodiment of the present invention is now shown in FIG. 10. A cylindrical member or cylinder 24 having an open upper end and a closed lower end and containing a viscous liquid, is fitted with a piston 25 which slides freely in an upward and downward direction therein.

A compression spring 26 is provided between the lower face of the piston 25 and an upper face of the base of the cylinder 24 to thus apply a resilient force on the piston 25 in an upward direction.

A plunger 22a is provided on the upper side of the piston 25, so that the amount that the plunger 22a protrudes from the cylinder 24 increases as the piston 25 rises under the resilient force of the compression spring 26.

A through hole 33 is formed in a central portion of a partition wall 32 of the piston 25 to provide a passage for communication between the regions above and below the piston 25.

A check valve 34 comprises a spring 38 and a ball 39 provided on a lower side portion of the partition wall 32. This check valve 34 opens only when the piston 25 is raised by the urging force of the spring 26.

A lower half of the plunger 22a is formed with a cylindrical portion 141 which slides on the inner peripheral face of the cylinder 24, and an upper half has an outer diameter a certain amount smaller than the inner diameter of the cylindrical portion 141, and is formed with a suction port or hole 142. Ambient air can be introduced in the inner space 31 within the piston 25 through the suction port 142.

Except for the suction port or hole 142 formed on the end of the plunger 22a, the aforementioned construction is very similar to the damper apparatus 19 shown in FIGS. 5(A) and 5(B) that was built into the auto tensioner. It should be noted that the autotensioner damper apparatus of this embodiment has an obstruction plate or baffle board 143 formed on the inside of the oil chamber or cavity, which is enclosed by the plunger 22a and piston 25, so as to bend the direction of flow of the fluid.

Figure 11:
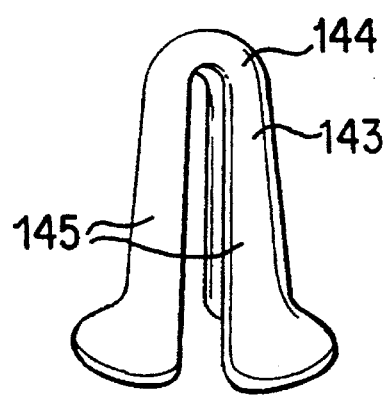
FIG. 11 is a perspective view of the damper apparatus of FIG. 10.

In the embodiment of this invention shown in FIGS. 10 and 11, this obstruction plate or baffle board 143 is made of a metal plate such as a stainless steel plate, which is formed through bending as shown FIG. 11. In other words, this obstruction plate or baffle board 143 has a blockage plate 144 at the top, and a plurality of legs 145 (there are three legs shown in this example) that extend downward from the outer peripheral edge of the blockage plate 144. By placing the bottom of these legs 145 on the partition wall 32, the blockage plate 144 is located between the inside of the upper half of the plunger 22a and the hole 33.

The auto-tensioner damper apparatus of this embodiment is constructed as described above, and is built into the auto tensioner shown in FIG. 2 or FIG. 3, and functions to restrict the displacement of the rocking member 12, which suppresses the vibration of the belt 1 and supports the pulley 5. This is substantially the same as the damper apparatus built into the autotensioner shown in FIG. 2 or FIG. 3.

In particular, in the auto-tensioner damper apparatus of this embodiment, the aforementioned blockage plate 144 is located inside the oil cavity, specifically between the inside of the upper half of the plunger 22a and the through hole 33. Therefore, even when the damper extends suddenly from being compressed, as shown in FIG. 10 and FIG. 12(A), to being extended, as shown in FIG. 12(F), it becomes difficult for the air existing above the viscous fluid 23 to reach the inside of the through hole 33 formed in the center of the partition wall 32.

In other words, when the tension in the belt 1 changes suddenly when the engine starts or stops, and the entire length of the damper device is suddenly extended by the biasing spring 26 from the condition where it is compressed by the spring 26. Specifically, the damper apparatus 19, compressed as shown in FIG. 12(A), extends as shown in FIG. 12(B) thru FIG. 12(E) until it reaches the position shown in FIG. 12(F). While the damper apparatus 19 is extending, air 40 is taken into the inside of the upper half of the plunger 22a through the suction port or hole 142, and in the initial stage of extension, as shown in FIG. 12(B), it expends the surface of the viscous fluid 23.

As the damper apparatus 19 extends further, this air 40 is inclined to penetrate further into the viscous fluid 23, as shown in FIGS. 12(C) thru 12(E). However, in the case of the damper apparatus of this embodiment, because the blockage plate 144, which is part of the obstruction plate or baffle board 143, is located between the inside of the upper half of the plunger 22a and the through hole 33, it becomes difficult for the air existing above the viscous fluid 23 to reach the inside of the through hole 33, which is formed in the center of the partition wall 32, even when the damper apparatus extends suddenly from being compressed, as shown in FIG. 10 and FIG. 12(A), to being extended, as shown in FIG. 12(F). As a result, there is no longer a possibility of the air 40 penetrating below the piston 25, preventing a loss in performance of the damper apparatus due to the air 40.

Figure 13:
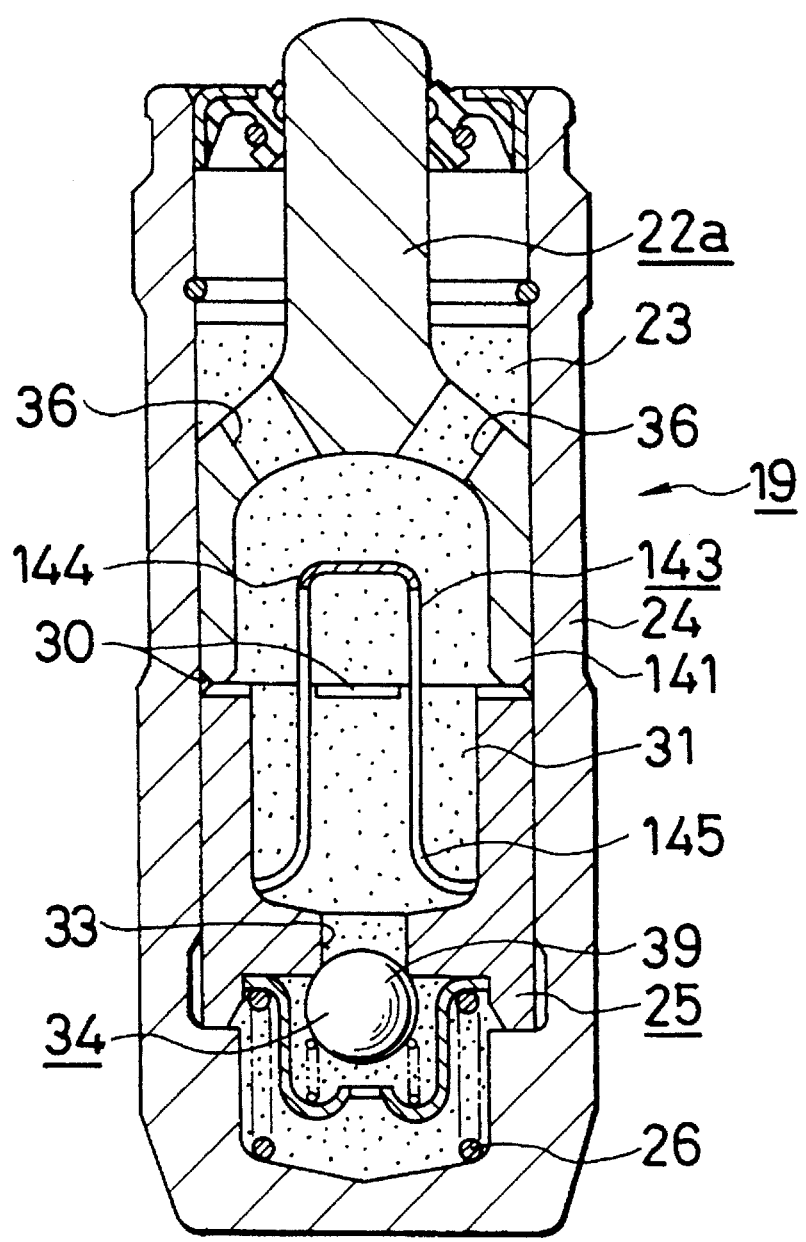
FIG. 13 is a longitudinal cross sectional view of an autotensioner damper apparatus related to the present invention.

Another embodiment of this invention is shown in FIG. 13, which is directed to a damper apparatus constructed as shown in FIG. 4 and different from that in FIG. 5. In other words, the damper apparatus of this embodiment is constructed by building the obstruction plate or baffle board 143, formed as shown in FIG. 11, into the damper apparatus 19 constructed as shown in FIG. 4. The embodiment of the invention shown in this figure, also differs from the construction shown in FIG. 4, in that the upper half of the plunger 22a is solid.

Figure 14A:
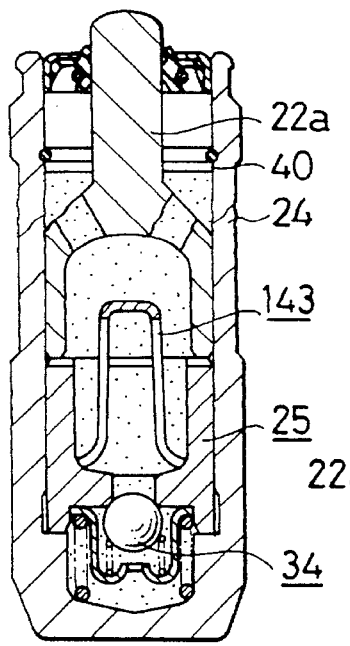
FIG. 14(A) to FIG. 14(E) are longitudinal cross sectional views of the damper apparatus of FIG. 13.
Figure 14B:
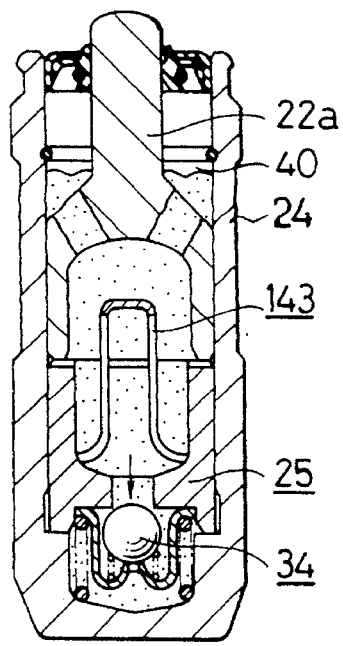
Figure 14C:
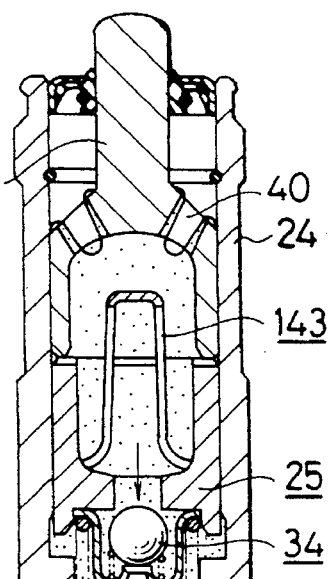
Figure 14D:
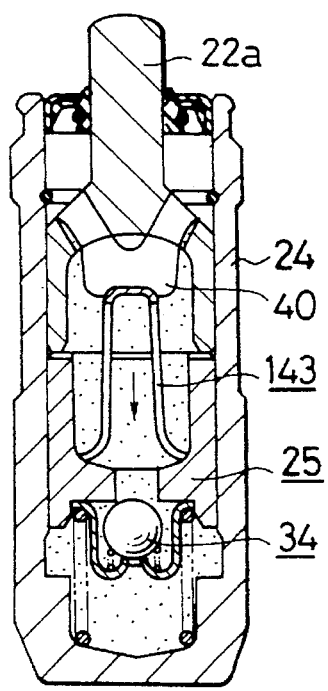
Figure 14E:
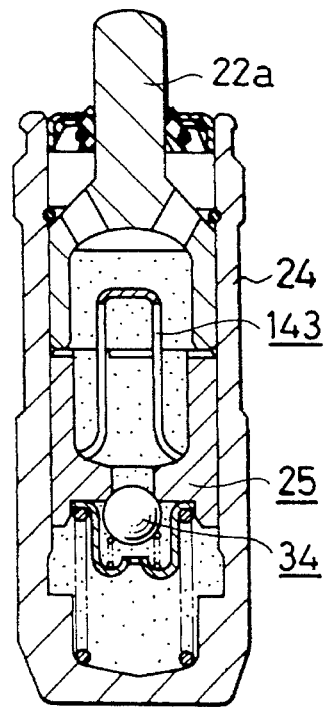

As a result, the air that is taken into the inner space 31 through the communicating holes 36 is unable to reach the through hole 33 in the center of the partition wall 32 of the piston 25, even when the damper apparatus 19 extends suddenly from being compressed, as shown in FIG. 14(A), passing through the stages shown in FIGS. 14(B) thru (C), until it is fully extended, as shown in FIG. 14(E). There is no longer a possibility of the air 40 penetrating below the piston 25, thus making it possible to prevent performance loss of the damper apparatus due to air 40.

Figure 15:
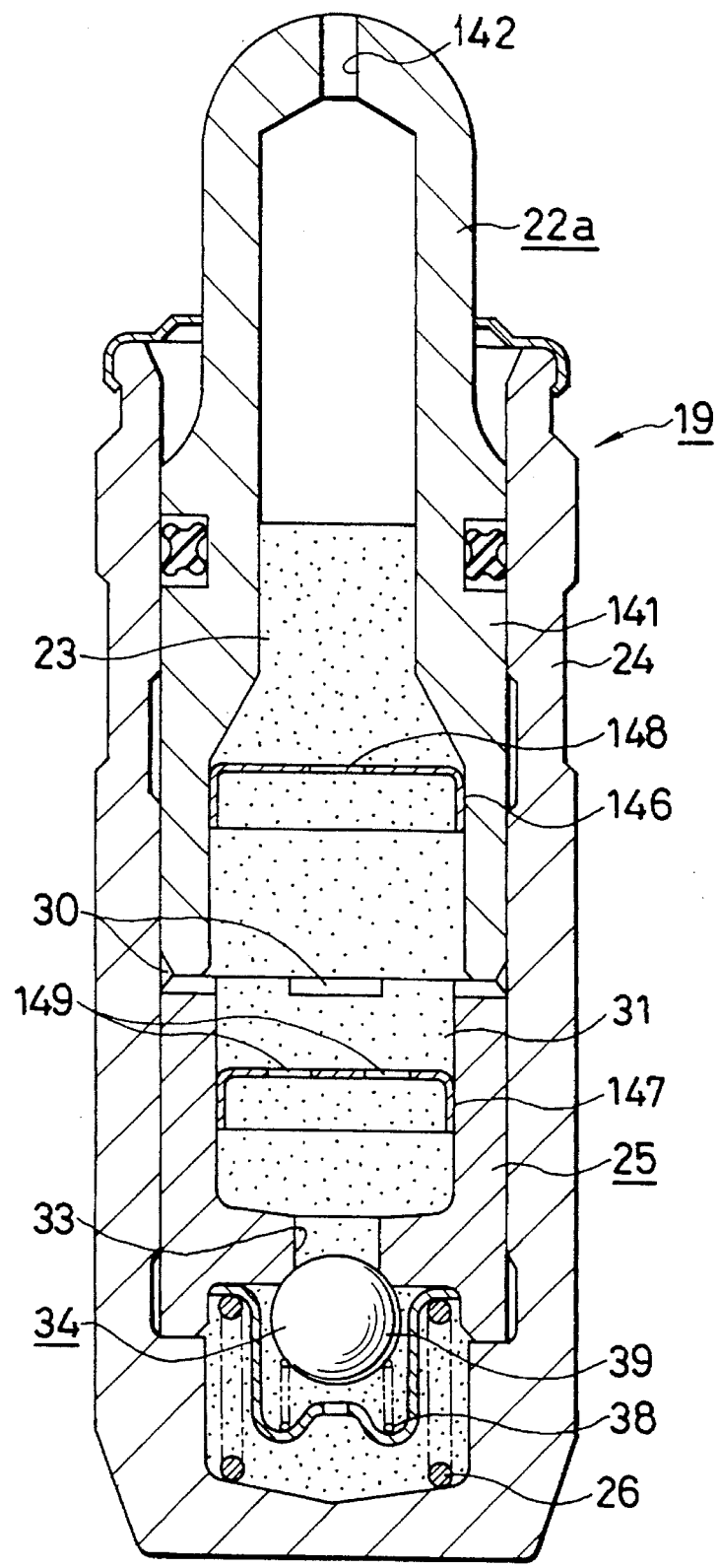
FIG. 15 is a longitudinal cross sectional view of an autotensioner damper apparatus related to the present invention.
Figure 16A:
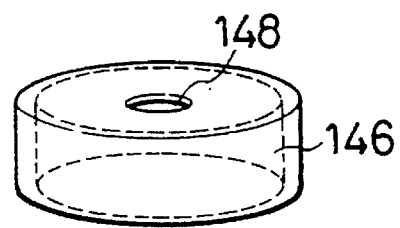
FIG. 16 (A) and FIG. (B) are a perspective view of a baffle board.
Figure 16B:
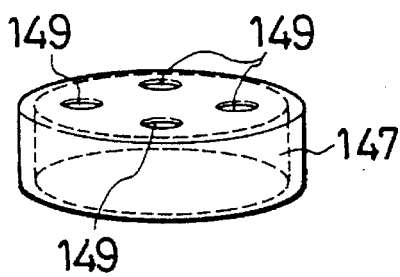

Next, FIGS. 15 and 16 show another embodiment of the invention. Used in this embodiment are first and second obstruction plates or baffle boards 146, 147 which are made from metal plates formed into the shape of petri dishes, as shown in FIGS. 16(A) and 16(B), by way of a pressing process. The first obstruction plate 146 has a small hole 148 formed in the center, and there are a plurality of small holes 149 formed around the outer circumference of the second obstruction plate 147 (there are four holes in the example shown in the figure). The first obstruction plate 146 is fitted inside the lower half of the plunger 22a, and the second obstruction plate 147 is fitted inside the top portion of the piston 25.

In this embodiment of the invention, when the damper apparatus 19 is extended, in order for the air 40 in the upper half of the plunger 22a to reach the hole 33 in the center of the partition wall 32 of the piston 25, it must pass through the aforementioned small holes 148, 149. However, because the location relationship of these small holes 148, 149 are orthogonally off center from the shaft, the air 40 cannot pass through both of these holes 148, 149 to reach the through hole 33. As a result, it is impossible for the air 40 to penetrate below the piston 25, thus making it possible to prevent performance loss of the damper apparatus due to air.

Figure 17:
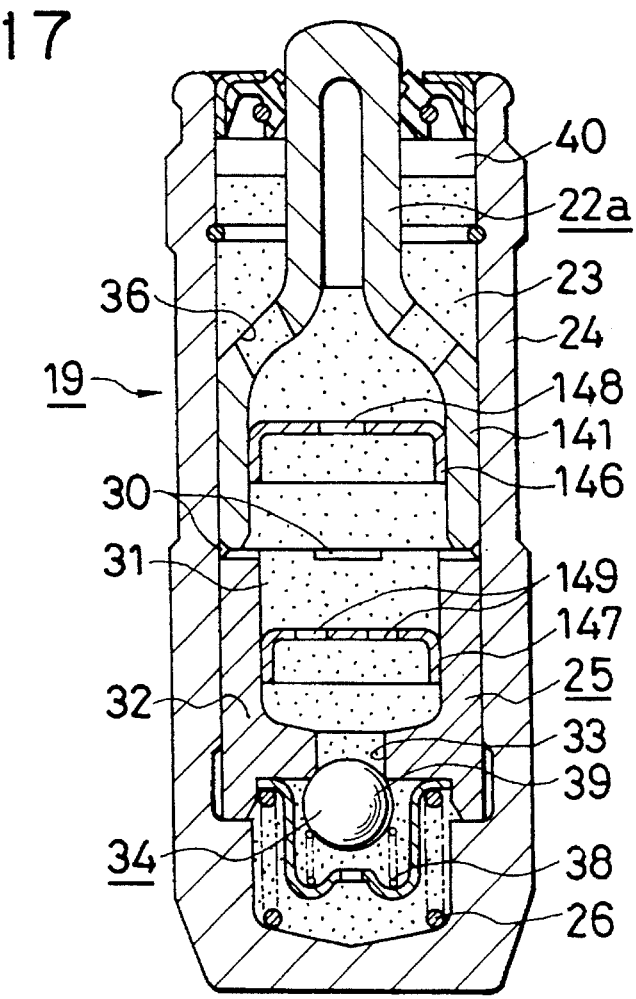
FIG. 17 is a longitudinal cross sectional view of an autotensioner damper apparatus related to the present invention.
Figure 18:
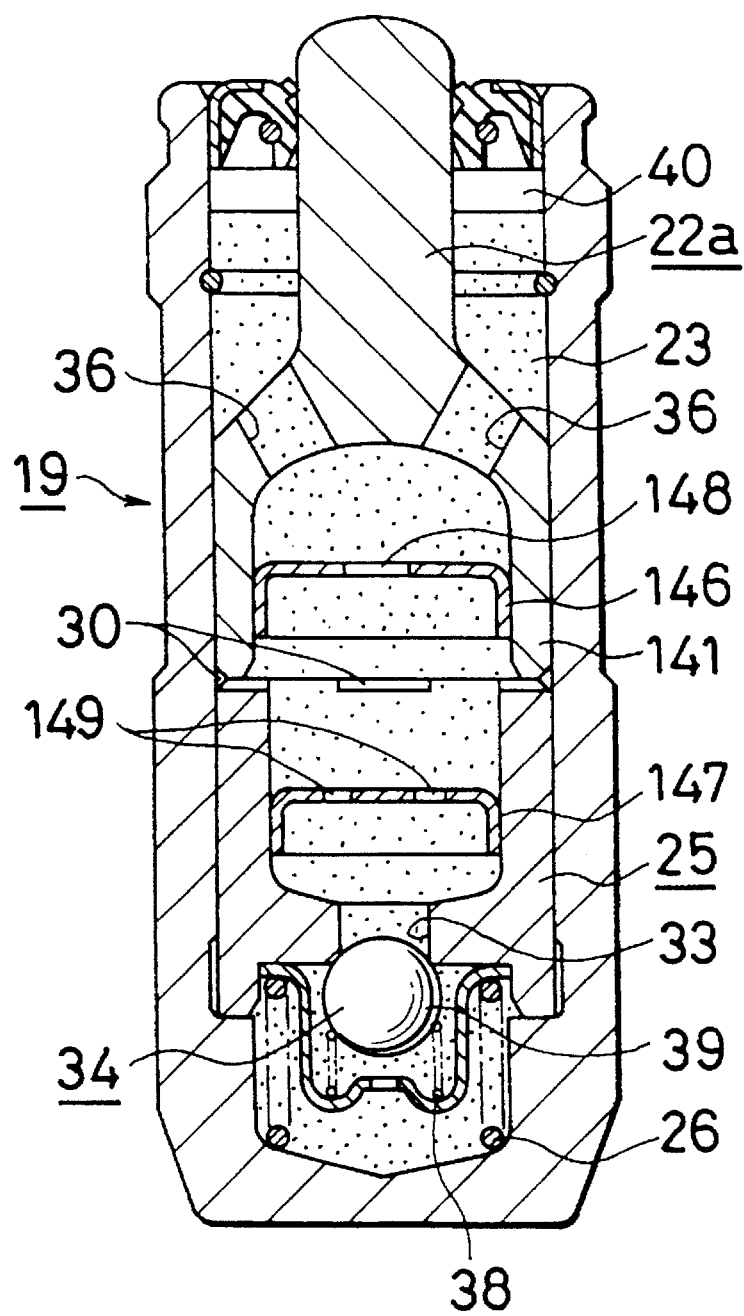
FIG. 18 is a longitudinal cross sectional view of an autotensioner damper apparatus related to the present invention.

Another embodiment of the invention is shown in FIGS. 17 and 18, this embodiment of the invention is directed to a damper apparatus constructed as shown in FIG. 4 and different from that in FIG. 5. The upper half of the plunger 22a can be made to be hollow as shown in FIG. 17, or can be made solid as shown in FIG. 18. The operation of the embodiment is substantially the same as that of the embodiment described above.

Figure 19:
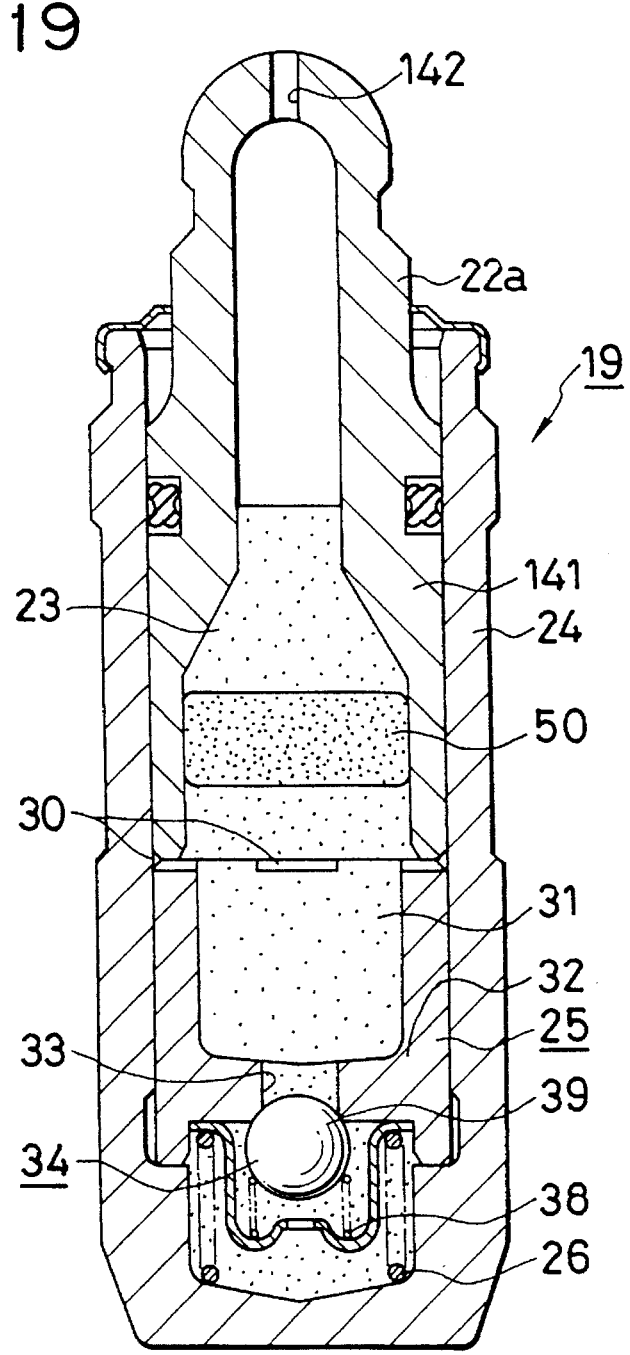
FIG. 19 is a longitudinal cross sectional view of an autotensioner damper apparatus related to the present invention.
Figure 20:
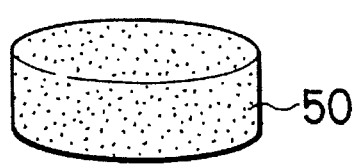
FIG. 20 is a perspective view of a porous member.
Figures 21A, 21B, 21C:
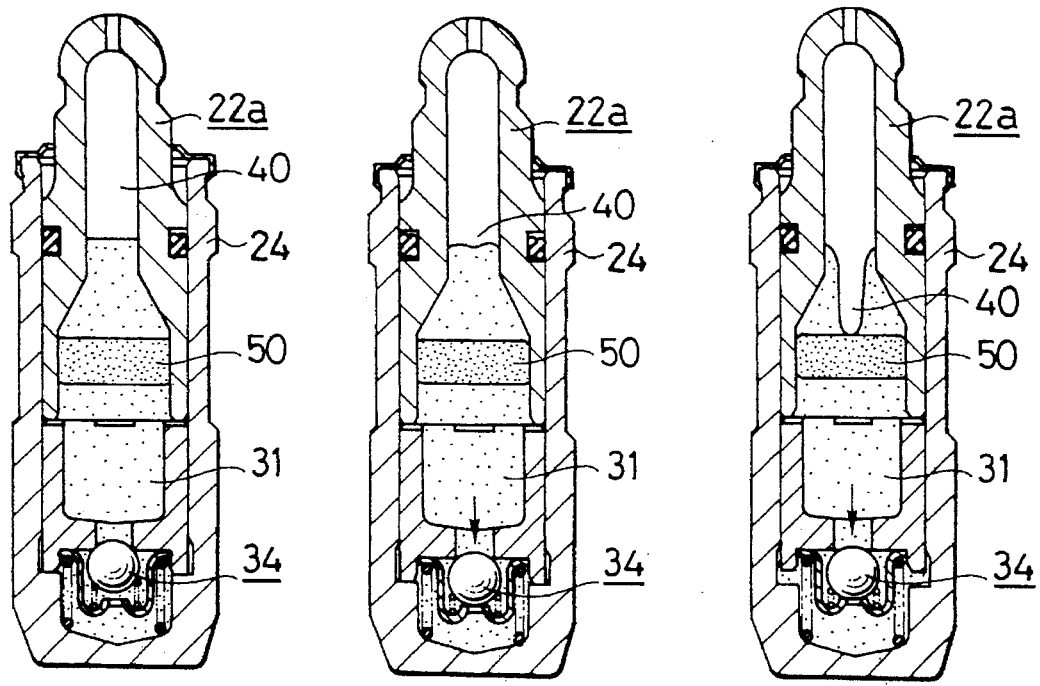
FIG. 21 (A) to FIG. 21(F) are longitudinal cross sectional views of the damper apparatus of FIG. 19.
Figures 21D, 21E, 21F:
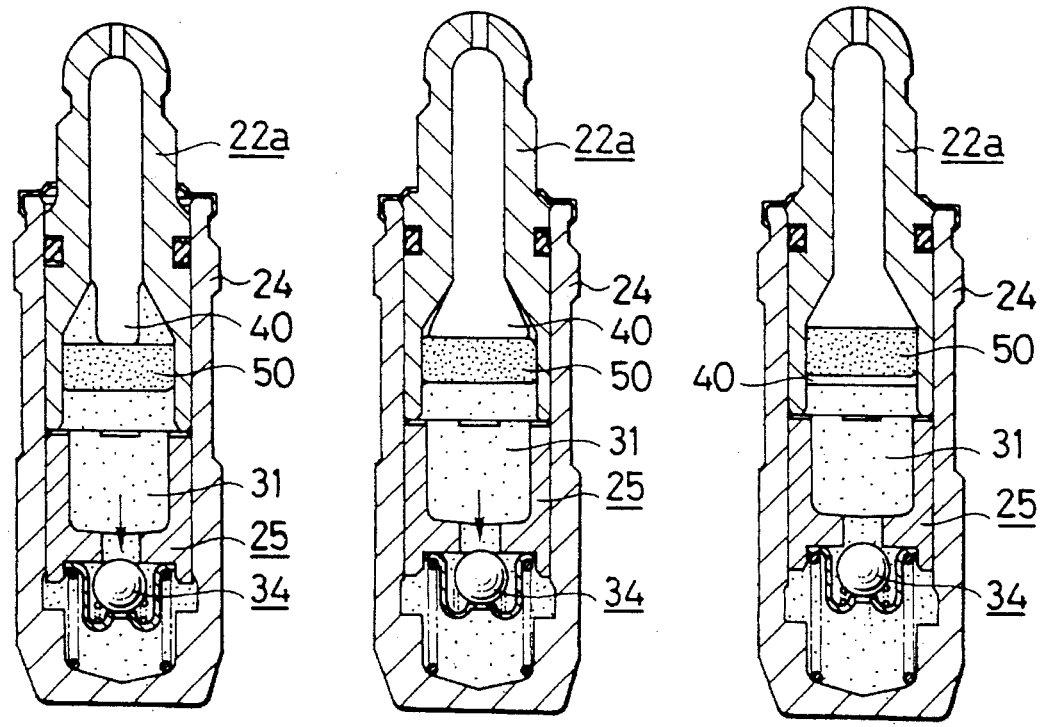

Next, FIG. 19 shows yet another embodiment of the invention. In this embodiment, a circular plate 50 made of porous material is fitted into the cylindrical part 141 of the plunger 22a, as shown in FIG. 20. As a result, the air 40 in the upper half of the plunger 22a is diffused as it passes through the porous material 50 as shown in FIG. 21(C) thru FIG. 21(E), even when the damper apparatus 19, compressed as shown in FIG. 21(A), is suddenly displaced as shown in FIG. 21(B) thru FIG. 21(E), until it is fully extended, as shown in FIG. 21(F). The air 40 is accordingly unable to penetrate deeply into the viscous fluid 23, and is unable to reach the hole 33 in the center of the partition wall 32 of the piston 25. As a result, the air 40 is unable to penetrate below the piston 25, thus making it possible to prevent performance loss of the damper apparatus due to air.

Figure 22:
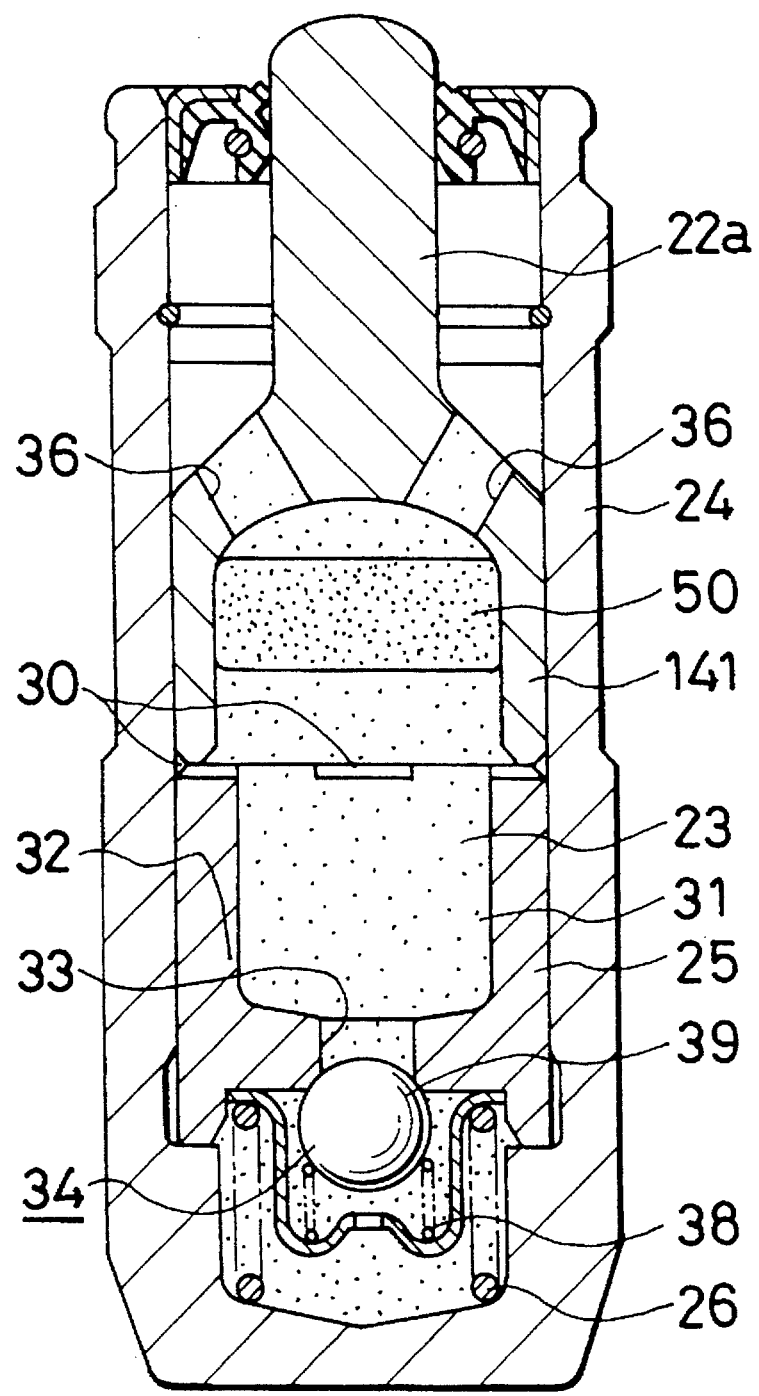
FIG. 22 is a longitudinal cross sectional view of an autotensioner damper apparatus related to the present invention.

Next, another embodiment of the invention is shown in FIG. 22, this embodiment of the invention is directed to a damper apparatus constructed as shown in FIG. 4 and different from that in FIG. 5. In other words, the damper apparatus of this embodiment of the invention is constructed by placing the porous material 50, formed as shown in FIG. 20, into the damper apparatus 19, constructed as shown in FIG. 4.

Figure 23A:
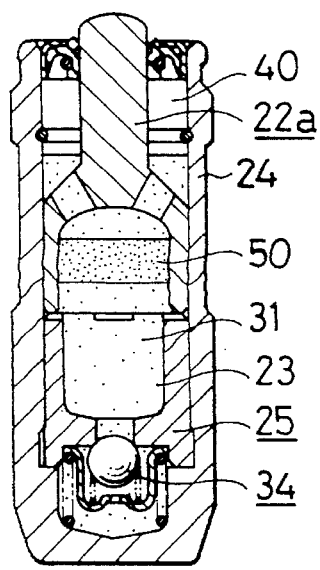
FIG. 23(A) to FIG. 23(E) are longitudinal cross sectional views of the damper apparatus of FIG. 22.
Figure 23B:
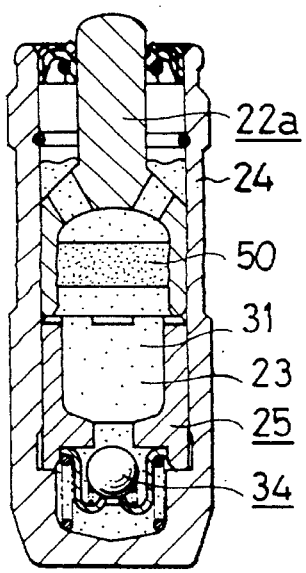
Figure 23C:
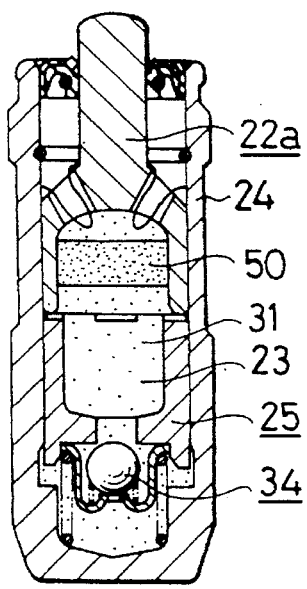
Figure 23D:
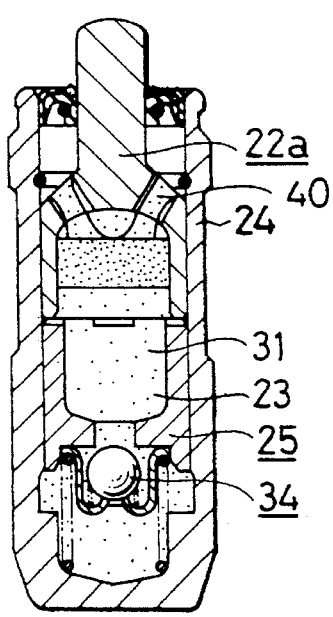
Figure 23E:
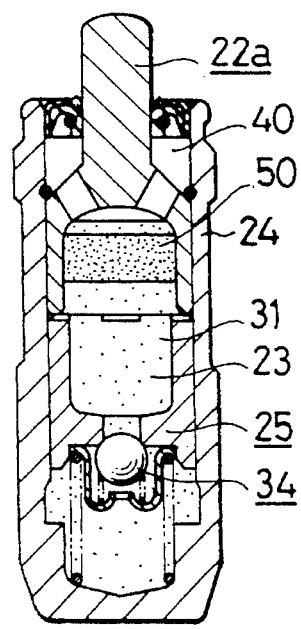

As a result, the air 40 that penetrates into the inner space 31 inside the connecting holes 36 is unable to reach the through hole 33 in the center of the partition wall 32 of the piston 25, even when the damper apparatus 19, compressed as shown in FIG. 23(A), is suddenly displaced, as shown in FIG. 23(B) thru FIG. 23(D), until it is fully extended, as shown in FIG. 23(E). Therefore, the air 40 cannot penetrate underneath the piston 25, thus making it possible to prevent performance loss of the damper apparatus due to the air 40.

Figure 24:
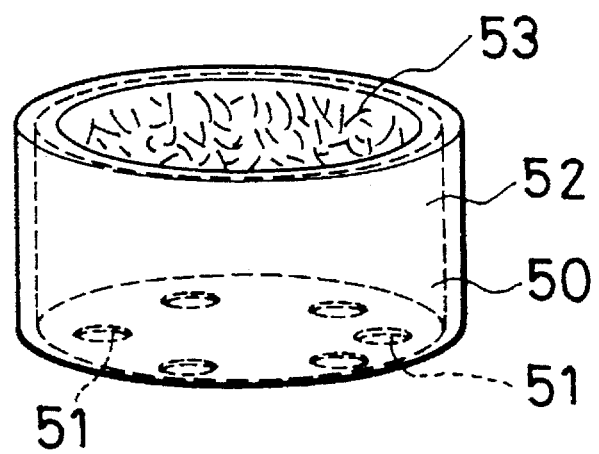
FIG. 24 is a perspective view of a porous member.
Figure 25:
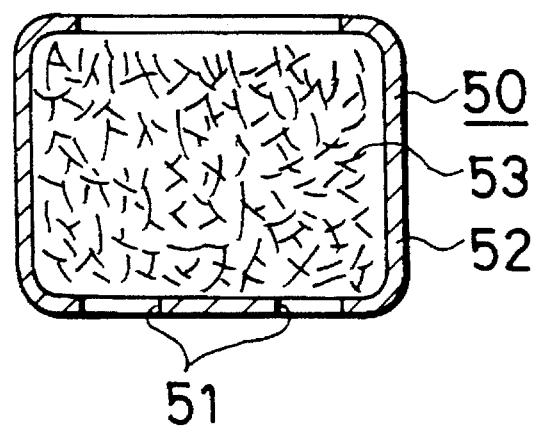
FIG. 25 is a vertical cross sectional view of the porous member of FIG. 24.

The porous material 50 used in the embodiment described above, can be made from a single piece of material such as sintered metal or spongy metal, or it is possible to make it from a composite material as shown in FIGS. 24 and 25. The porous material 50 shown in FIGS. 24 and 25 is made by filling a cylindrical case 52, which has several small holes 51 in the bottom, with a fibrous material 53 such as stainless steel filament. When this porous material is then placed inside the damper apparatus 19, the case 52 is fitted into the cylindrical portion 141 of the plunger 22a.

Figure 26:
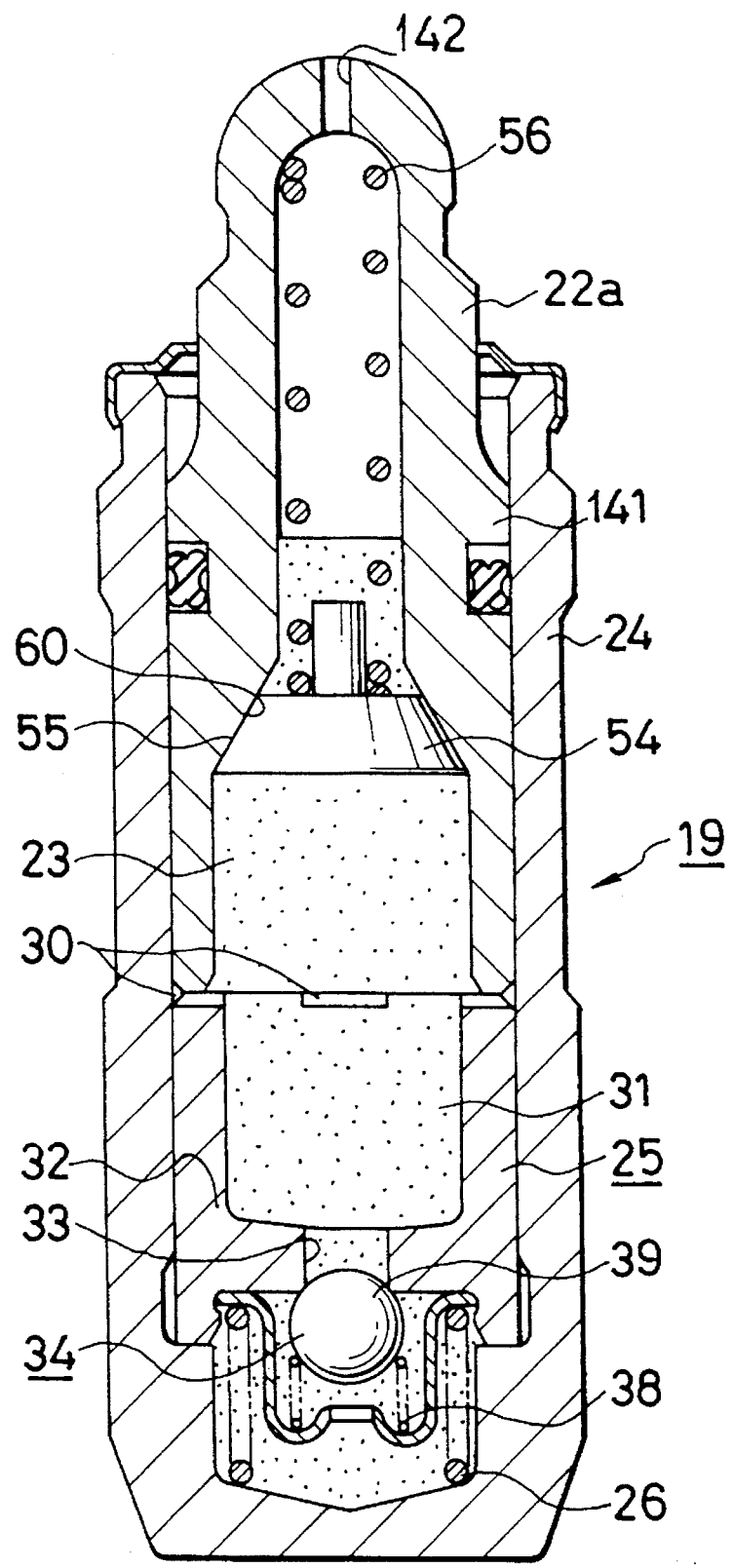
FIG. 26 is a longitudinal cross sectional view of an autotensioner damper apparatus related to the present invention.
Figure 27:
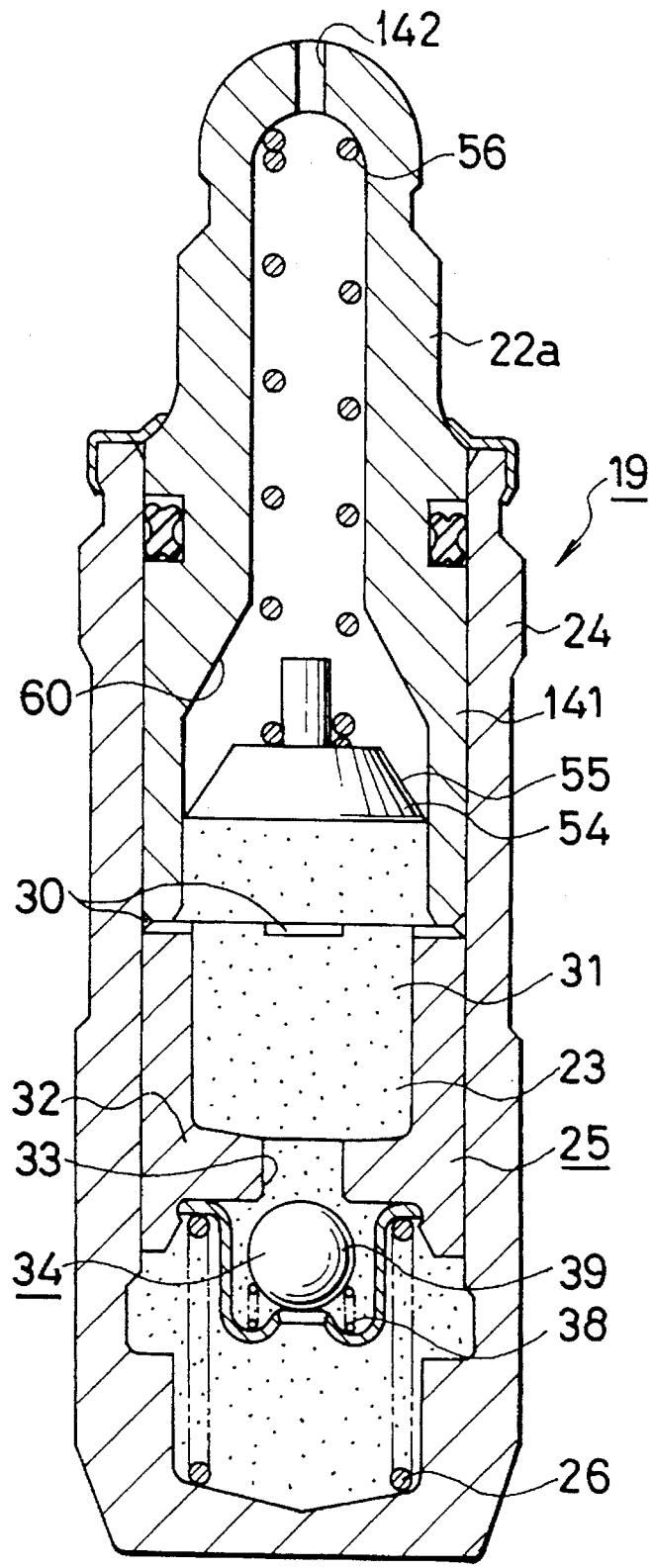
FIG. 27 is a longitudinal cross sectional view of an autotensioner damper apparatus related to the present invention.
Figure 28:
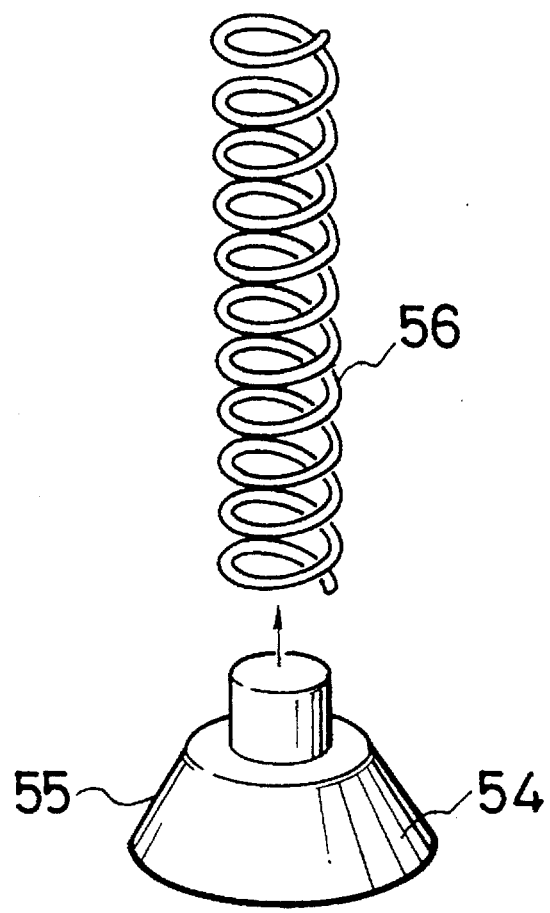
FIG. 28 is a perspective, exploded view of a float and a spring.

Another embodiment of the invention is shown in FIGS. 26 and 27. In this embodiment, there is a float 54 that floats on top of the viscous fluid 23 in the upper part of the cylindrical section 141 of the plunger 22a. The outside peripheral surface of this float 54 is a cone-shaped convex surface 55, and this cone-shaped convex surface 55 fits tightly against the cone-shaped concave surface 60 formed above the oil chamber on the inner peripheral surface of the middle portion of the plunger 22a.

Also, there is a compression spring 56 located between the top surface of the float 54 and the inside surface at the top of the plunger 22a, and this spring 56 applies an elastic force in the downward direction to the float 54. This downward force applied to the float 54 by the elastic force of the compression spring 56 is less than the upward buoyancy force acting on the float 54 when it is completely submerged in the viscous fluid 23.

When the damper apparatus 19, constructed as described above, is compressed, as shown in FIG. 26 and FIG. 29(A), and then displaces, as shown in FIG. 29(B) thru FIG. 29(E), until it is fully extended, as shown in FIG. 27 and FIG. 29(F), the air 40 existing in the upper half of the plunger 22a enters the inner space 31 through the small gap between the cone-shaped convex surface 55 and the cone-shaped concave surface 60, as the plunger 22a rises. When this happens, the center portion of the surface of the viscous fluid 23 is covered by the float 54, and therefore, this air 40 and the viscous fluid 23 enters into the inner space 31 from the inside of the upper half only through the circular gap between the outer peripheral edge of the float 54 and the inside peripheral surface of the cylindrical section 41. Accordingly, the air 40 does not penetrate deeply into the viscous fluid 23, and is unable to reach the through hole 33 in the center of the partition wall 32 of the piston 25. As a result, the air 40 does not penetrate underneath the piston 25, thus making it possible to prevent performance loss of the damper apparatus due to air.

Figure 30:
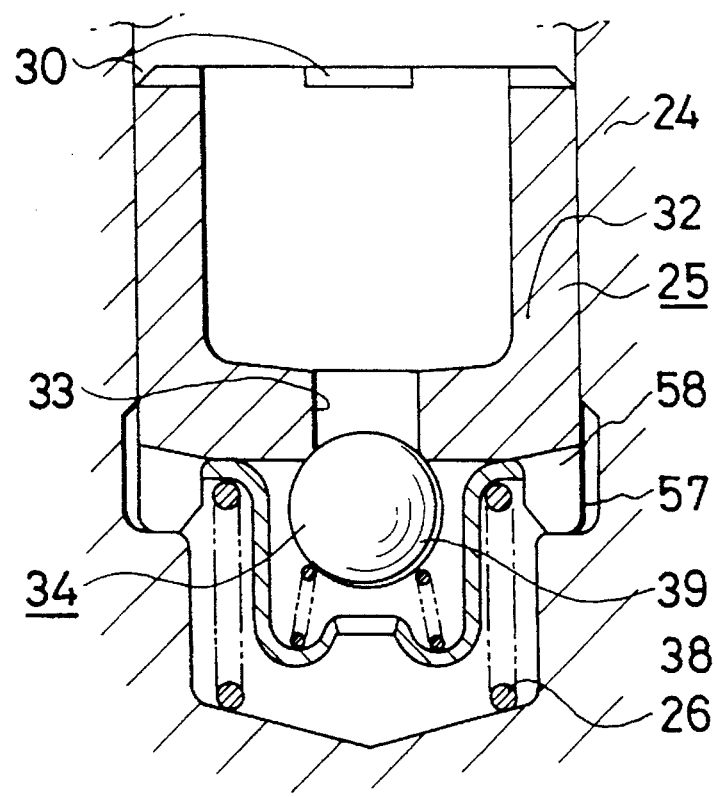
FIG. 30 is a cross sectional view of a lower portion of a damper apparatus illustrating a condition wherein air can easily discharged from a region below the piston.
Figure 31:
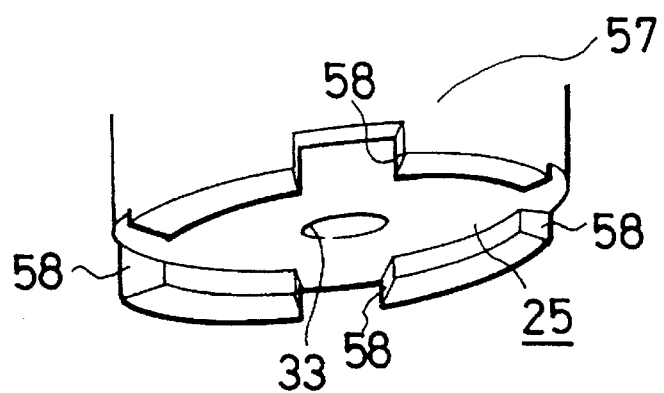
FIG. 31 is a perspective view of the bottom of the piston.

Next, yet another embodiment of the invention is shown in FIGS. 30 and 31. In this embodiment of the invention, the bottom surface of the partition wall 32 of the piston 25 is formed in a cone-shaped convex surface which gradually slopes upward from the center toward the outer edge. Also, a plurality of notches 58 are formed in the depending wall 57 located on the outer peripheral edge of the bottom surface of the piston 25, and the outer peripheral edge of the cone-shaped convex surface is continuous with the far or deepest end of the notches 58.

In this embodiment, even if air penetrates below the partition wall 32, this air is guided to the bottom surface of the partition wall 32 and then passes through the notches 58 until it reaches the area where the outer peripheral surface of the piston 25 and the inner peripheral surface of the cylinder 24 mate together. In this area where the outer peripheral surface of the piston 25 and the inner peripheral surface of the cylinder 24 mate together, there is only a gap where the viscous fluid 23 flows smoothly, and therefore, air, having a much smaller viscosity than the viscous fluid 23, passes through this gap and moves toward the top of the piston 25, and is quickly discharged. As a result, it is possible to greatly reduce the residence time that air exists below the piston 25, thus making it possible to prevent performance loss of the damper apparatus due to the air 40.

Figure 32:
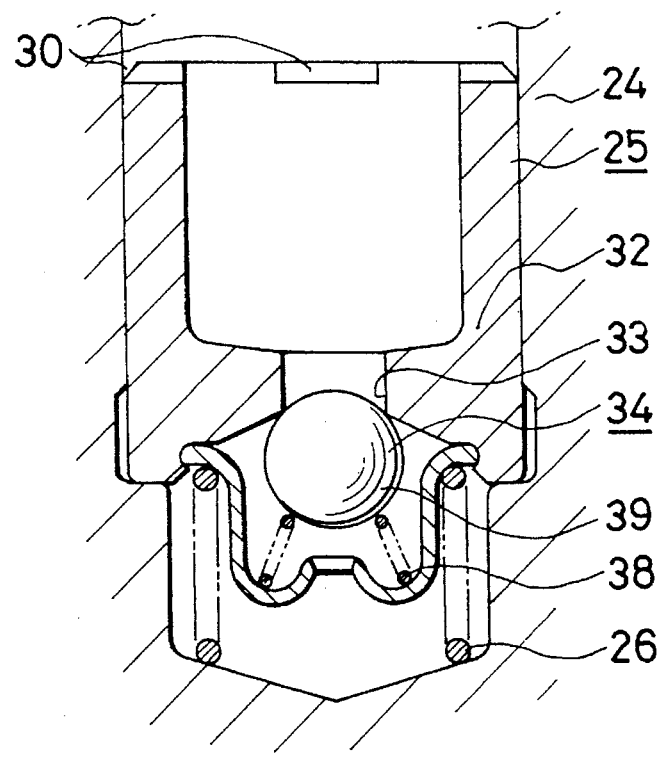
FIG. 32 is a cross sectional view of a lower portion of a damper apparatus illustrating a condition wherein air can easily discharged from a region below the piston.

Another embodiment of the invention is shown in FIG. 32. In this embodiment, the bottom surface of the partition wall 32 of the piston 25 is formed in a cone-shaped concave surface which slopes upward from the outside edge toward the center.

In this embodiment, even if air 40 penetrates underneath the partition wall 32, this air 40 is guided to the bottom surface of the partition wall 32, and is collected in the area around the through hole 33 formed in the center of the partition wall 32. At the instant the ball 39 of the check valve 34 moves just a little, the air moves above the piston 25, and is quickly discharged. As a result, the residence time that the air stays underneath the piston 25 becomes extremely short, thus making it possible to prevent performance loss of the damper apparatus due to the air 40.

Figure 33:
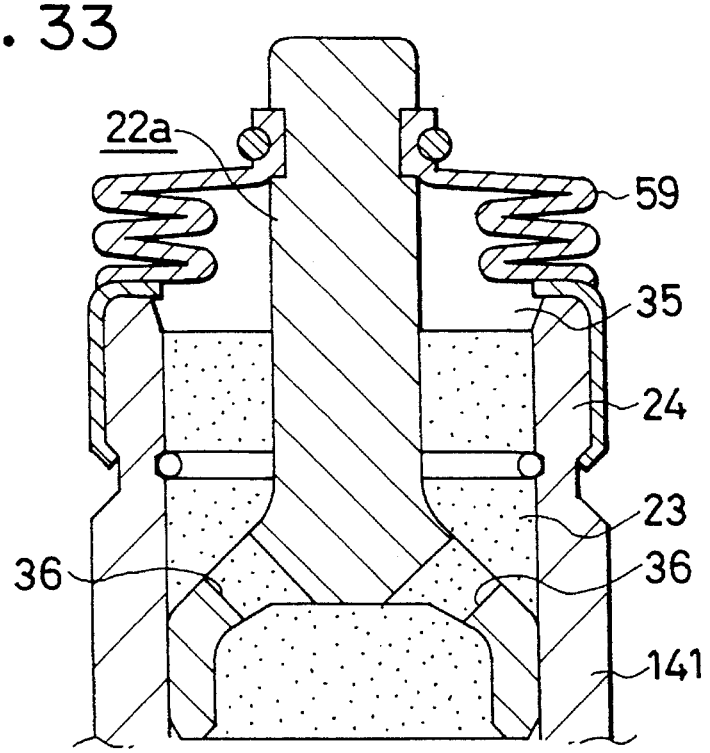
FIG. 33 is a cross sectional view of the upper part of the cylinder.

In each of the embodiments of the invention described above, a bellows 59, as shown in FIG. 33, can be placed between the top end of the cylinder 24 and the top end of the plunger 22a, making it possible to prevent foreign matter such as dust from entering into the damper apparatus.

Figure 34:
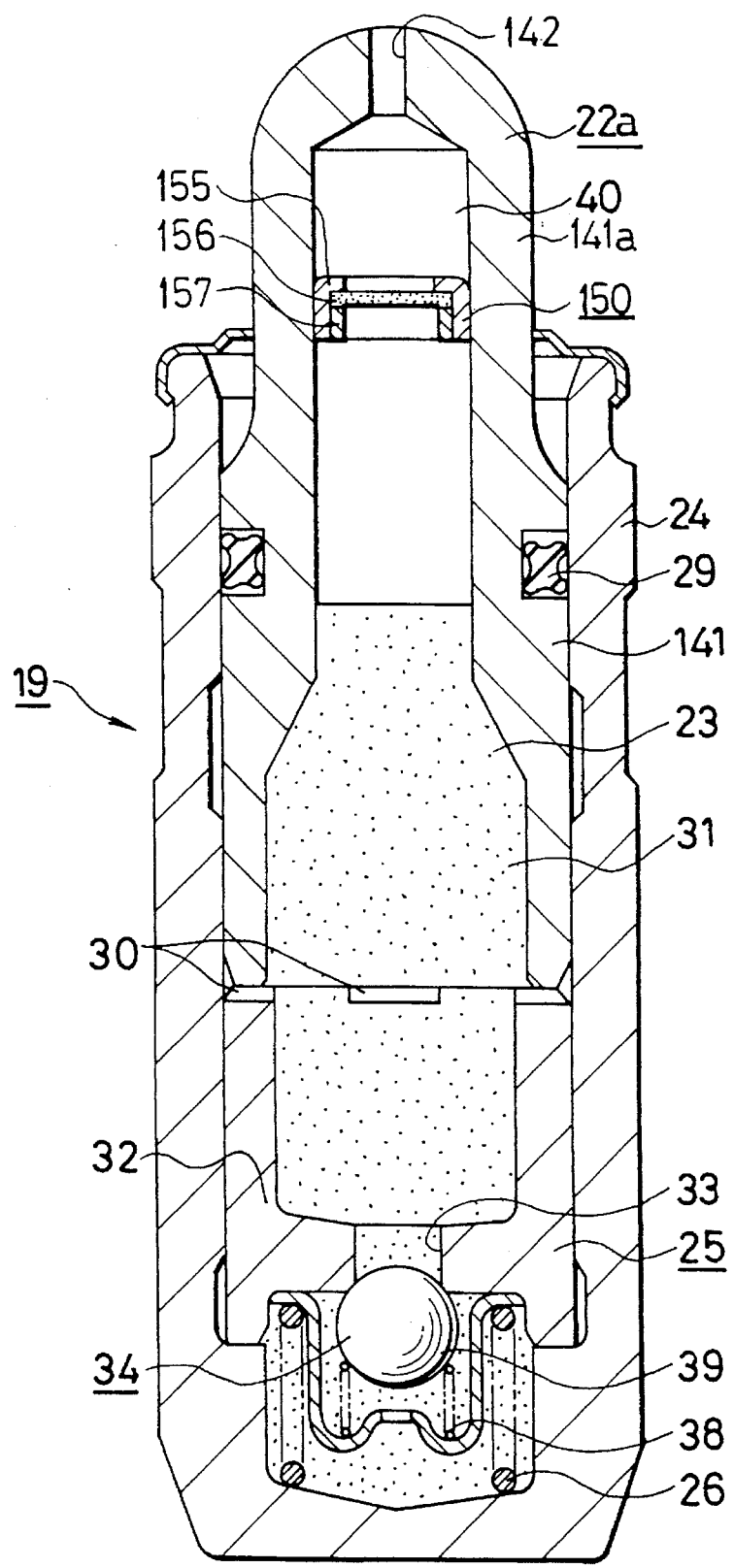
FIG. 34 is a cross-sectional view during compression of autotensioner damper apparatus in an embodiment of this invention.

Another embodiment of the invention is shown in FIG. 34. A viscous fluid 23 is filled inside the hollow cylinder 24, which is open at the top and closed at the bottom, and this cylinder 24 is fitted around the piston 25 allowing it to move freely up and down. Also, there is a biasing spring 26, located between the bottom surface of this piston 25 and the top surface of the bottom of the cylinder 24, which applies an elastic force on the piston 25 in the upward direction. Disposed above the piston 25 is a plunger 22a, which sticks out from the cylinder 24 increasingly as the piston 25 rises due to the elastic force of the biasing spring 26. There is a through hole 33 formed in the center of the partition wall 32 of the piston 25, and this through hole 33 forms a path for communicating the top side with the underneath side of the piston 25. Disposed underneath the partition wall 32 is a spring 38 and ball 39 which form a check valve 34. This check valve 34 opens only when the piston 25 rises due to the elastic force of the biasing spring 26.

Disposed in the lower half of the plunger 22a is a cylindrical part 141 that comes in contact with the inner peripheral surface of the cylinder 24, while disposed in the upper half of the plunger 22a is a part 141a whose outer diameter is a little smaller than that of the inner diameter of the cylinder 24. The bottom end of the cylindrical part 141a is open, and the top end of the small diameter part 141a is closed. The plunger 22a is formed as a hollow cylinder with a bottom.

Figure 35:
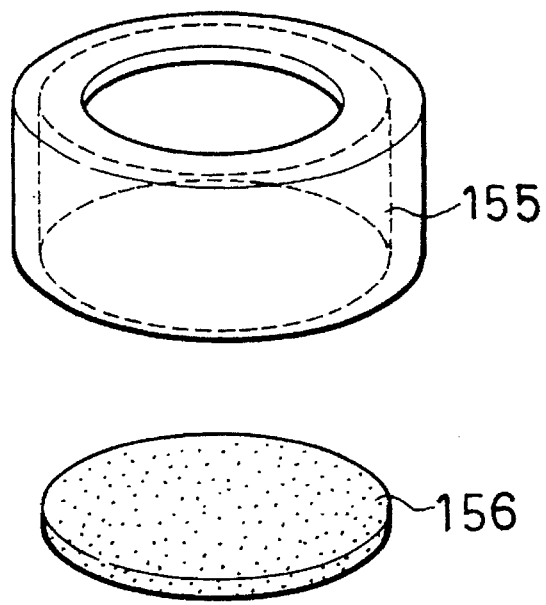
FIG. 35 is a pictorial exploded view of one example of dust filter.
Figure 36:
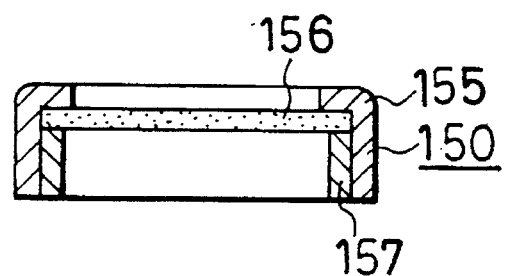
FIG. 36 is a cross-sectional view of the dust filter in assembly shown in FIG. 35.

At the top end of the plunger 22a, there is a suction port or hole 142 for communicating the inside of the plunger 22a with the outside. Also, inside the upper portion of the small diameter section 141a, there is a permeable dust filter 150 and it closes off the inside of the small diameter section 141a. The dust filter 150 is shown in detail in FIGS. 35 and 36, and comprises a retaining ring 155 that is pressed from a metal plate, a main filter body 156 that is made from a porous material such as sintered metal, and a metal support ring 157 formed in a short cylindrical shape.

In constructing this dust filter 150, first the main filter body 156 is inserted into the annular retaining ring 155, which has an L-shaped cross section, and then the support ring 157 is fitted inside the retaining ring 155, in order to secure the main filter body 156 from coming out. The retainer ring 155 of the assembled dust filter 150 is then fitted and secured inside the small diameter section 141a.

The auto-tensioner damper apparatus of this embodiment, constructed as described above, is installed in the auto tensioner as shown in FIG. 2 or FIG. 3, and it functions to suppress vibration of the belt 1, and to restrict displacement of the rocking member 12 that supports the pulley 5, substantially in the same manner as the damper apparatus in previous embodiments of the autotensioner.

In the auto-tensioner damper apparatus of this embodiment, air is drawn in through the suction port or hole 142 and passes through the dust filter 150 to remove any dust particles, and then the clean air is introduced into the damper apparatus 19. This helps to prevent operation failure of the damper apparatus 19, while also making it possible to prevent a rise in pressure inside the damper apparatus 19 when the temperature rises and when the damper apparatus 19 is compressed.

Figure 37:
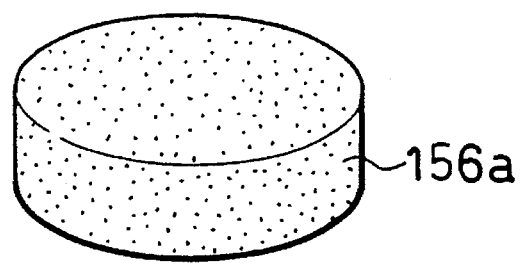
FIG. 37 is a pictorial perspective view of another example of a dust filter.

This dust filter 150 is not limited to the thin main filter body 156 reinforced by the retaining ring 157 and support ring 157 as described above, but could also be just a thick main filter body 156a, as shown in FIG. 37. This filter 156a is placed inside the small diameter section 141a of the plunger 22a as is. Also, in order to prevent foreign matter such as dust from getting in between the top opening of the cylinder 24 and the outer surface of the plunger 22a, a boot or bellows as cover could be placed between the top opening section and the outer peripheral.

With the autotensioner dampers of the embodiments constructed and operated as described above, since air can be reliably prevented from entering into the region below the piston, then deterioration in damper performance due to air is avoided. It is also possible to prevent the pressure inside the damper apparatus from increasing, and to prevent leakage of the viscous fluid and prevents wear of the seal ring.

Accordingly, in the present invention, the autotensioner has a pulley which is improved in following the rapid change in tension in the belt.

What is claimed is:

1. An autotensioner for use in applying a tension to a moving belt, comprising:

a base member having a projection, a rocking member rockingly mounted to the base member through a first axle and having an arm, a pulley rotatably mounted to the rocking member through a second axle for applying the tension to the moving belt, and a damper apparatus provided between the projection of the base member and the arm of the rocking member, the damper apparatus comprising;

a cylinder having upper and lower chambers and a lower section with a bottom, a piston fitted into the cylinder and having an upper section formed with a push member, a spring member provided between the lower section of the cylinder and the piston, and placed under compression so as to push the piston up, the lower chamber in the cylinder defined by the cylinder bottom and the piston, the upper chamber in the cylinder formed over the piston, a viscous fluid contained in the lower and upper chambers in the cylinder, a leakage path for communicating the lower chamber with the upper chamber so as to apply a resistance to the viscous fluid flowing from the lower chamber to the upper chamber, a release path for communicating the lower chamber with the upper chamber and having a check valve which is opened when the viscous fluid flows from the upper chamber to the lower chamber and is closed when the viscous fluid flows from the lower chamber to the upper chamber, and a blockage member provided above the release path in the viscous fluid in the upper chamber for preventing any rapid inflow of air to the release path.

2. The autotensioner of claim 1, wherein the leakage path is provided between the outer peripheral surface of the piston and the inner peripheral surface of the cylinder.

3. An autotensioner according to claim 1, wherein the blockage member comprises a blockage plate having an outer peripheral edge and a plurality of legs extending from the outer peripheral edge.

4. An autotensioner according to claim 1, further comprising air contained in the upper chamber above the viscous fluid.

5. An autotensioner according to claim 4, wherein the upper chamber has a passage which allows air to pass into and out of the upper chamber.

6. An autotensioner according to claim 1, wherein the upper chamber has a passage which allows air to pass into and out of the upper chamber.

7. An autotensioner for use in applying a tension to a moving belt, comprising:

a base member having a projection, a rocking member rockingly mounted to the base member through a first axle and having an arm, a pulley rotatably mounted to the rocking member through a second axle for applying the tension to the moving belt, a damper apparatus provided between the projection of the base member and the arm of the rocking member, and a first spring member disposed between the rocking member and the base member for producing a tension to apply a resilient force to the pulley to press against the belt, the damper apparatus comprising;

a cylinder having upper and lower chambers and a lower section with a bottom, a piston fitted into the cylinder and having an upper section formed with a push member, a second spring member provided between the lower section of the cylinder and the piston, and placed under compression so as to push the piston up, the lower chamber in the cylinder defined by the cylinder bottom and the piston, the upper chamber in the cylinder formed over the piston, a viscous fluid contained in the lower and upper chambers in the cylinder, a leakage path for communicating the lower chamber with the upper chamber so as to apply a resistance to the viscous fluid flowing from the lower chamber to the upper chamber, a release path for communicating the lower chamber with the upper chamber and having a check valve which is opened when the viscous fluid flows from the upper chamber to the lower chamber and is closed when the viscous fluid flows from the lower chamber to the upper chamber, and a blockage member provided above the release path in the viscous fluid in the upper chamber for preventing any rapid inflow of air to the release path.

8. An autotensioner according to claim 7, wherein the blockage member comprises a blockage plate having an outer peripheral edge and a plurality of legs extending from the outer peripheral edge.

9. The autotensioner of claim 7, wherein the leakage path is provided between the outer peripheral surface of the piston and the inner peripheral surface of the cylinder.

10. An autotensioner for use in applying a tension to a moving belt, comprising:

a base member having a projection, a rocking member rockingly mounted to the base member through a first axle and having an arm, a pulley rotatably mounted to the rocking member through a second axle for applying the tension to the moving belt, and a damper apparatus provided between the projection of the base member and the arm of the rocking member, the damper apparatus comprising;

a cylinder having upper and lower chambers and a lower section with a bottom, a piston fitted into the cylinder so as to move within a stroke with uppermost and lowermost ends and having an upper section formed with a push member, a spring member provided between the lower section of the cylinder and the piston, and placed under compression so as to push the piston up, the lower chamber in the cylinder defined by the cylinder bottom and the piston, the upper chamber in the cylinder formed over the piston, a viscous fluid contained in the lower and upper chambers in the cylinder, a leakage path for communicating the lower chamber with the upper chamber so as to apply a resistance to the viscous fluid flowing from the lower chamber to the upper chamber, and a release path for communicating the lower chamber with the upper chamber and having a check valve which is opened when the viscous fluid flows from the upper chamber to the lower chamber and is closed when the viscous fluid flows from the lower chamber to the upper chamber, and a blockage member provided above the release path in the viscous fluid in the upper chamber for preventing any rapid inflow of air to the release path, the push member comprising a lower hollow body and an upper protrusion, and having an upper vent passage provided adjacent the upper protrusion for communication between the inside and the outside of the lower body, and the release path provided through the piston for communicating the lower chamber with the upper chamber, whereby the viscous fluid has a liquid surface kept above the upper vent passage even when the push member is raised to the uppermost end of its stroke.

11. An autotensioner according to claim 10, wherein the blockage member comprises a blockage plate having an outer peripheral edge and a plurality of legs extending from the outer peripheral edge.

12. An autotensioner for use in applying a tension to a moving belt, comprising:

a base member having a projection, a rocking member rockingly mounted to the base member through a first axle and having an arm, a pulley rotatably mounted to the rocking member through a second axle for applying the tension to the moving belt, a damper apparatus provided between the projection of the base member and the arm of the rocking member, and a first spring member disposed between the rocking member and the base member for producing a tension to apply a resilient force to the pulley to press against the belt, the damper apparatus comprising;

a cylinder having upper and lower chambers and a lower section with a bottom, a piston fitted into the cylinder so as to move within a stroke with uppermost and lowermost ends and having an upper section formed with a push member, a second spring member provided between the lower section of the cylinder and the piston, and placed under compression so as to push the piston up, the lower chamber in the cylinder defined by the cylinder bottom and the piston, the upper chamber in the cylinder formed over the piston, a viscous fluid contained in the lower and upper chambers in the cylinder, a leakage path for communicating the lower chamber with the upper chamber so as to apply a resistance to the viscous fluid flowing from the lower chamber to the upper chamber, a release path for communicating the lower chamber with the upper chamber and having a check valve which is opened when the viscous fluid flows from the upper chamber to the lower chamber and is closed when the viscous fluid flows from the lower chamber to the upper chamber, and a blockage member provided above the release path in the viscous fluid in the upper chamber for preventing any rapid inflow of air to the release path, the push member comprising a lower hollow body and an upper protrusion, and having an upper vent passage provided adjacent the upper protrusion for communication between the inside and the outside of the lower body, and the release path provided through the piston for communicating the lower chamber with the upper chamber, whereby the viscous fluid has a liquid surface kept above the upper vent passage even when the push member is raised to the uppermost end of its stroke.

13. An autotensioner according to claim 12, wherein the blockage member comprises a blockage plate having an outer peripheral edge and a plurality of legs extending from the outer peripheral edge.

14. An autotensioner for use in applying a tension to a moving belt, comprising:

a base member having a projection, a rocking member rockingly mounted to the base member through a first axle and having an arm, a pulley rotatably mounted to the rocking member through a second axle for applying the tension to the moving belt, and a damper apparatus provided between the projection of the base member and the arm of the rocking member, the damper apparatus comprising;

a cylinder having upper and lower chambers and a lower section with a bottom, a piston fitted into the cylinder and having an upper section formed with a push member, a spring member provided between the lower section of the cylinder and the piston, and placed under compression so as to push the piston up, the lower chamber in the cylinder define by the cylinder bottom and the piston, the upper chamber in the cylinder formed over the piston, a viscous fluid contained in the lower and upper chambers in the cylinder, air contained in the upper chamber above the viscous fluid, a leakage path for communicating the lower chamber with the upper chamber so as to apply a resistance to the viscous fluid flowing from the lower chamber to the upper chamber, a release path for communicating the lower chamber with the upper chamber and having a check valve which is opened when the viscous fluid flows from the upper chamber to the lower chamber and is closed when the viscous fluid flows from the lower chamber to the upper chamber, and a deflection member provided above the release path in the viscous fluid in the upper chamber for deflecting any rapid inflow of air from the upper chamber to prevent the air from reaching the release path.

* * * * *